United States Patent
Wu et al.

(10) Patent No.: US 7,368,487 B2
(45) Date of Patent: May 6, 2008

(54) AQUEOUS INK JET PRINTABLE COMPOSITIONS

(75) Inventors: Dong Wu, Woodbury, MN (US); Larry R. Krepski, White Bear Lake, MN (US); Kevin M. Lewandowski, Inver Grove Heights, MN (US); Caroline M. Ylitalo, Stillwater, MN (US); Peter T. Elliott, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/000,284

(22) Filed: Nov. 15, 2001

(65) Prior Publication Data

US 2003/0144375 A1    Jul. 31, 2003

(51) Int. Cl.
 *C09D 11/00*    (2006.01)
(52) U.S. Cl. .................... 523/160; 523/161; 524/261; 524/265; 524/266; 524/539; 524/540; 524/590; 528/28
(58) Field of Classification Search ............... 523/160, 523/161; 528/28; 524/590, 539, 540, 261, 524/265, 266
See application file for complete search history.

(56) References Cited

U.S. PATENT DOCUMENTS

| | | | |
|---|---|---|---|
| 3,891,487 A * | 6/1975 | Hoey ......................... 156/78 |
| 4,480,085 A | 10/1984 | Larson |
| 4,596,846 A | 6/1986 | Bohne et al. |
| 4,597,794 A | 7/1986 | Ohta et al. |
| 4,692,188 A | 9/1987 | Ober et al. |
| 5,082,757 A | 1/1992 | Keoshkerian et al. |
| 5,172,133 A | 12/1992 | Suga et al. |
| 5,221,334 A | 6/1993 | Ma et al. |
| 5,415,686 A | 5/1995 | Kurabayashi et al. |
| 5,427,835 A | 6/1995 | Morrison et al. |
| 5,462,768 A | 10/1995 | Adkins et al. |
| 5,523,344 A * | 6/1996 | Maksymkiw et al. ....... 524/507 |
| 5,656,071 A | 8/1997 | Kappele et al. |
| 5,679,138 A | 10/1997 | Bishop et al. |
| 5,679,724 A | 10/1997 | Sacripante et al. |
| 5,679,754 A | 10/1997 | Larson et al. |
| 5,700,851 A | 12/1997 | Banning et al. |
| 5,747,626 A | 5/1998 | Krepski et al. |
| 5,756,633 A * | 5/1998 | Larson ......................... 528/28 |
| 5,821,283 A | 10/1998 | Hesler et al. |
| 5,846,306 A * | 12/1998 | Kubota et al. ........... 106/31.75 |
| 5,852,074 A | 12/1998 | Tsutsumi et al. |
| 5,854,331 A | 12/1998 | Ma et al. |
| 5,877,235 A | 3/1999 | Sakuma et al. |
| 5,889,083 A * | 3/1999 | Zhu ........................... 523/161 |
| 5,891,231 A | 4/1999 | Gnerlich et al. |
| 5,929,160 A * | 7/1999 | Krepski et al. ............. 524/590 |
| 5,965,634 A | 10/1999 | Idogawa et al. |
| 5,990,202 A | 11/1999 | Nguyen et al. |
| 5,998,501 A | 12/1999 | Tsutsumi et al. |
| 6,025,412 A | 2/2000 | Sacripante et al. |
| 6,046,295 A | 4/2000 | Frisch, Jr. et al. |
| 6,059,869 A | 5/2000 | Fassler et al. |
| 6,063,834 A | 5/2000 | Kappele et al. |
| 6,075,085 A * | 6/2000 | Fukuda et al. ............. 524/501 |
| 6,114,411 A | 9/2000 | Nakamura et al. |
| 6,126,731 A | 10/2000 | Kemeny et al. |
| 6,136,890 A | 10/2000 | Carlson et al. |
| 6,139,594 A | 10/2000 | Kincaid et al. |
| 6,165,239 A | 12/2000 | Hedrick et al. |
| 6,232,369 B1 | 5/2001 | Ma et al. |
| 6,234,624 B1 | 5/2001 | Erdtmann et al. |
| 6,271,285 B1 * | 8/2001 | Miyabayashi et al. ...... 523/160 |
| 6,533,408 B1 * | 3/2003 | Erdtmann et al. .......... 347/100 |
| 6,680,089 B2 * | 1/2004 | Miyake et al. ............. 428/32.8 |
| 6,740,152 B1 * | 5/2004 | Fukuda ..................... 106/31.72 |
| 2003/0236321 A1 * | 12/2003 | Sano et al. ................. 523/160 |

FOREIGN PATENT DOCUMENTS

| | | |
|---|---|---|
| EP | 0 783 023 A2 | 7/1997 |
| EP | 0 835 890 A1 | 4/1998 |
| EP | 0 851 014 A2 | 7/1998 |
| EP | 0 984 046 A1 | 3/2000 |
| EP | 1 059 341 A1 | 12/2000 |
| GB | 2 344 825 A | 6/2000 |
| JP | 08-325491 | 12/1996 |
| JP | 10046092 | 2/1998 |
| JP | 10088045 | 4/1998 |
| JP | 11061017 | 3/1999 |
| JP | 2000001639 | 1/2000 |
| JP | 2000109733 | 4/2000 |
| WO | WO 94/13723 | 6/1994 |
| WO | WO 97/03101 | 1/1997 |
| WO | WO 97/03252 | 1/1997 |
| WO | WO 98/18843 | 5/1998 |
| WO | WO 99/05192 | 2/1999 |
| WO | WO 99/23181 | 5/1999 |
| WO | WO 01/32789 A1 | 5/2001 |

* cited by examiner

*Primary Examiner*—Bernard Lipman
(74) *Attorney, Agent, or Firm*—Colene H. Blank

(57) ABSTRACT

Ink jet printable compositions comprise an aqueous vehicle, particles of a self-crosslinking polymer, and optional colorant. In one embodiment, an ink jet printable ink may comprise an aqueous vehicle, a colorant, and a silyl-terminated sulfopoly(ester-urethane) polymer. In another embodiment, an ink jet printable ink comprises an aqueous vehicle, colorant, and at least 20 weight percent dispersed shear deformable polymer particles wherein the polymer is self-crosslinking. In another aspect, the invention concerns methods of printing a composition, and printed articles produced thereby.

22 Claims, 2 Drawing Sheets

AQUEOUS INK JET PRINTABLE COMPOSITIONS

FIELD OF THE INVENTION

The invention relates to printable aqueous compositions. More specifically, the invention relates to ink jet printable aqueous compositions comprising particles of a self-crosslinking polymer.

BACKGROUND OF THE INVENTION

Ink jet printing is an important digital printing method due to its high resolution, flexibility, high speed, and affordability. Such printing is accomplished by ejecting ink from an ink jet print head of the printing apparatus via numerous methods which employ, for example, pressurized nozzles, electrostatic fields, piezo-electric elements, and/or heaters for vapor phase bubble formation.

Many inks currently used in ink jet printers are either water-based or solvent-based. Of these, water-based inks have been widely accepted in the printing industry due to their environmentally friendly attributes. Typical water-based inks consist of little more than pigment or dye in a water/glycol vehicle.

For outdoor applications, where exposed to the elements (e.g., rain), water resistant printable substrates (e.g., polymer films) are desirable. When used with water-based inks, polymer film substrates may be porous and/or have a specialized receptor coating to absorb the ink vehicle and prevent color bleed, both of which features add additional manufacturing steps and associated cost. Further, in many applications employing water-based inks, the printed surface of the substrate must be laminated to a transparent protective cover layer (i.e., an overlaminate) in order to be usable outdoors. Alternatively, the printed image may be made resistant to the elements by means of an additional processing step such as heating in an oven or exposure to ultraviolet (i.e., UV) light. Such additional materials, equipment, and process steps require additional labor and increase the cost of graphic preparation.

The rate at which graphic articles may be prepared depends, at least in part, on the solids content of the ink being used. High solids inks provide high image density without the need for overprinting. Attempts to prepare high solids inks have met with various problems: flocculation of the pigment, clogging of the ink jet nozzle, poor jetting characteristics, and the like.

For at least these reasons, it would be desirable to have a water-based ink, suitable for outdoor applications, that can be directly printed on a wide range of substrates, including non-porous polymeric films, without the need for a specialized ink receptor coating or additional process steps. Further, it would be desirable that such an ink would have a high solids content.

SUMMARY OF THE INVENTION

The present invention provides ink jet ink compositions comprising an aqueous vehicle, dispersed particles of a self-crosslinking polymer, and optional colorant.

In one aspect, the invention provides an ink jet ink composition comprising an aqueous vehicle, a colorant, and dispersed particles of a silyl-terminated sulfopoly(ester-urethane).

In one embodiment, the invention provides an ink jet ink composition comprising an aqueous vehicle, a colorant, and dispersed particles of a silyl-terminated sulfopoly(ester-urethane) having the formula:

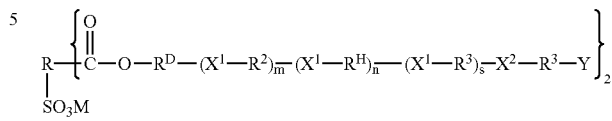

wherein

R represents a $C_6$-$C_{12}$ aryl triyl or $C_1$-$C_{20}$ aliphatic triyl group (trivalent aryl or aliphatic group) wherein M is $H^+$, an alkali metal cation, an alkaline earth metal cation, or a primary, secondary, tertiary, or quaternary ammonium cation;

each m independently represents 0 or 1, each n independently represents 0 or 1, each s independently represents $s=0$ or 1, with the proviso that, at least one of m or n must be equal to 1;

each $R^D$ independently represents:

1) at least one of a divalent linear or branched organic group of 20 to 150 carbon atoms in units of 2 to 12 methylene groups and arylene groups of 6 to 10 carbon atoms separated by at least one of 1 to 50 catenary oxygen atoms and by 1 to 30 oxycarbonyl groups,

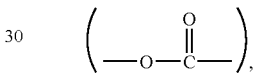

2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms, which organic group can be chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 4 to 6 carbons, or 3) the structure $\{-R^1(X^1-R^2-X^1-R^1)_p-\}$ where p is an integer from 1 to 5, produced by the reaction of a polyol with an isocyanate having the structure $OCN-R^2-NCO$ to produce a segment having a molecular weight of from 500 to 4,000;

each $R^1$ independently represents a linear or branched alkylene group having 2 to 12 carbon atoms, or an arylene group having 6 to 10 carbon atoms;

each $X^1$ independently represents

each $R^2$ independently represents an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of at most 15 carbon atoms;

each $X^2$ independently represents

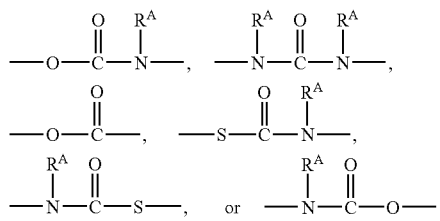

wherein each $R^A$ independently represents hydrogen, lower alkyl having 1 to 4 carbon atoms, or $R^1$—Y;

each $R^H$ independently represents a divalent hydrophobic group selected from divalent oligomeric siloxanes having the structure

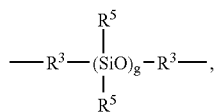

divalent organic groups having the structure

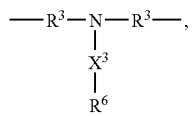

or divalent organic groups having one of the structures

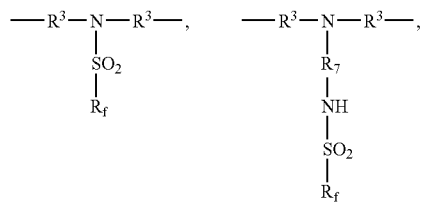

or quaternary salts thereof, wherein each $R^3$ independently represents a divalent linear or branched alkylene group having 2 to 12 carbon atoms, or a divalent arylene or alkarylene group having 6 to 20 carbon atoms;

each Y independently represents H, an alkyl group having from 1 to 20 carbon atoms, an aryl group having from 6 to 10 carbon atoms, or

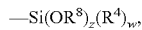

wherein each $R^4$ independently represents a monovalent lower alkyl group having from 1 to 4 carbon atoms, each $R^8$ is H or a monovalent lower alkyl group having from 1 to 4 carbon atoms, each z is independently 2 or 3, each w is independently 0 or 1, and wherein z+w=3, with the proviso that at least one Y has the formula

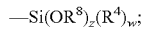

each $R^5$ independently represents a monovalent group selected from the group consisting of alkyl groups of 1 to 12 carbon atoms, aryl having 6 to 10 carbon atoms, or aralkyl groups having 6 to 10 carbon atoms, with at least 70 percent of $R^4$ being methyl;

each g independently represents an integer of from 10 to 300;

each $X^3$ independently represents a covalent bond, a carbonyl group,

or a divalent amido group

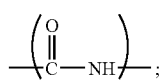

each $R^6$ independently represents a monovalent group selected from the group consisting of alkyl groups of about 4 to about 60 carbon atoms;

each $R^7$ independently represents a divalent group selected from the group consisting of alkylene groups of 2 to about 12 carbon atoms; and each $R_f$ independently represents a monovalent saturated fluoroaliphatic group having 6 to 12 carbon atoms, at least four of which are fully-fluorinated carbon atoms.

In some embodiments, the ink is substantially free of organic solvents.

In some embodiments, the ink is contained within an ink jet printer cartridge.

In another aspect, the invention provides a blendable ink set comprising at least three blendable ink compositions each comprising a silyl-terminated sulfopoly(ester-urethane) polymer.

In some embodiments, the ink set may comprise four, five, or more blendable inks.

In another aspect, the invention provides a method of imaging a substrate comprising ink jet printing an aqueous composition on a substrate wherein the aqueous composition comprises an aqueous vehicle and dispersed particles of a silyl-terminated sulfopoly(ester-urethane).

In another aspect, the invention provides imaged articles prepared by ink jet printing an aqueous composition onto a substrate wherein the aqueous composition comprises an aqueous vehicle and a silyl-terminated sulfopoly(ester-urethane) polymer.

In another aspect, the invention provides an ink jet ink comprising an aqueous vehicle, colorant, and dispersed shear deformable polymer particles wherein the polymer is self-crosslinking.

In one embodiment, the self-crosslinking polymer is silyl-terminated.

Printed ink compositions according to the invention self-crosslink on drying to form durable, waterfast images that may eliminate the need to overlaminate, or post cure, the printed graphic.

Ink compositions of the invention may be advantageously used on a wide range of substrates, including non-porous uncoated polymer films. Images printed with the inks of the current invention may be outdoor durable for up to 5 years, or more, when formulated with suitable colorants, stabilizers, and UV absorbers.

Ink compositions of the invention may be extremely stable and show no signs of settling even after several years. In some embodiments, ink compositions of the invention having high solids content are characterized by unexpectedly good jetting performance.

Desirably, ink compositions according to the invention have low film forming temperatures close to 0° C., and do not comprise organic coalescing solvents to aid in film formation.

In this application:

"aliphatic group" means straight chain and branched acyclic and non-aromatic cyclic hydrocarbons having up to 20 carbon atoms;

"alkyl" and "alkylene" groups mean the monovalent and divalent residues remaining after removal of one or two hydrogen atoms, respectively, from a linear or branched hydrocarbon having 1 to 20 carbon atoms;

"aromatic group" means any group having one or more unsaturated carbon rings having 5 to 12 carbon atoms;

"aromatic ester" means an ester group derived from an aryl or arylene carboxylic acid and an aliphatic alcohol;

"aryl" and "arylene" groups mean the residues remaining after the removal of one or two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$;

"arylene or alkylene sulfonic acid group or salt thereof" means a group comprising at least one aromatic or hydrocarbon group substituted by at least one pendant sulfonic acid group or a salt thereof;

"blendable" means that the compositions being referred to may be combined in any proportion without significant adverse effects on their stability and ink jet printing performance;

"cycloalkyl" and "cycloalkylene" groups mean the monovalent and divalent residues remaining after removal of one or two hydrogen atoms, respectively, from a cyclic hydrocarbon having 3 to 12 carbon atoms;

"electrophilic" refers to a compound, composition, or reagent that forms a bond to its reaction partner by accepting both bonding electrons from that reaction partner;

"group" means the specified moiety or any group containing the specified moiety (as by substitution or extension) that does not adversely affect the composition;

"lower alkyl group" means an alkyl group having 1 to 4 carbon atoms;

"molecular weight" means the sum of the atomic weights (in grams per mole) of all atoms in a group of atoms or in a segment of a polymer and under circumstances where the group or segment may be a mixture of two or more groups or segments is the number average of molecular weights of the groups or segments;

"nucleophilic" refers to a compound, composition, or reagent that forms a bond to its reaction partner by donating both bonding electrons to that reaction partner;

"polymer" includes oligomers;

"random polymer" means like groups can be located at various points along the polymer backbone and not similarly sequenced;

"self-crosslinking" means that upon exposure to ambient conditions a covalently crosslinked network forms without any applied energy or curative;

"silyl-terminated" means having at least one polymer or oligomer end group having the formula

wherein each $R^4$, $R^8$, z, and w are as defined hereinabove;

"sulfo group" or "sulfonate group" or "sulfonic acid group or salt thereof" means a $—SO_3M$ group where M can be H or a cation, preferably an alkali metal ion; and "sulfopoly(ester-urethane)" means a symmetric or asymmetric polymer or a random polymer comprising at least one sulfo group, at least one

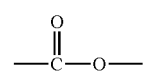

group, and at least one

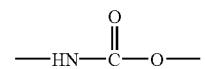

group, optionally containing other functional groups such as

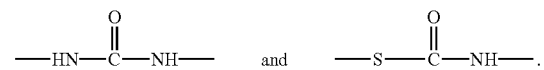

DETAILED DESCRIPTION OF THE PREFERRED EMBODIMENTS

Ink jet printable compositions of the invention typically comprise an aqueous vehicle, dispersed shear deformable particles of a self-crosslinking polymer, optional colorant, and optional surfactant.

Typically, ink jet inks have relatively low viscosity: 3-30 mPa·sec at the print head operating temperature, and low elasticity: typically power law index of 0.98 or greater in order to jet properly. Aqueous ink jet inks comprising polymer particles typically have a viscosity less than 10 mPa·s at 20° C., and at a shear rate of 1000 $s^{-1}$, and a solids content of the ink of less than 10 weight percent.

According to the invention, the use of shear deformable polymeric (e.g., silyl-terminated sulfopoly(ester-urethane)) particles in ink jet printable compositions allows ink jet printing of compositions (e.g., inks) having a solids content greater than 20 weight percent, desirably greater than 30 weight percent, and more desirably greater than 50 weight percent, and having viscosities and elasticity values that are significantly outside the normal ink jet printable range. Desirably, such compositions are free of organic co-solvents. It is also highly desirable that the shear deformable polymeric particles are not substantially swelled by the aqueous vehicle, since this may result in increased viscosity and/or the particles clogging the ink jet print head nozzle.

Measurement of solvent swelling of polymer particles may be determined by well-known methods including light scattering, weight gain, or other methods known in the art. Shear deformation of particles may be measured by optical rheometry, for example, by measuring linear dichroism of a dispersion of particles as a function of time as described by G. Fuller in "Optical Rheometry of Complex Fluids", Oxford University Press, New York, 1995; and G. G. Fuller and K. J. Mikkelsen in The Journal of Rheology, vol. 33, p. 761 (1989). Particles that are shear deformable typically show a change in linear dichroism following application of a step strain.

While not being bound by theory, it is believed that using shear deformable polymeric particles gives rise to extension thinning behavior in the ink jet nozzle where under the high shear conditions (typically in excess of $10^6$ s$^{-1}$) in the print head, soft deformable polymeric particles deform into ellipsoids. Such anisotropic particles align in the extensional flow field in the nozzle giving rise to extension thinning behavior. Such behavior may be observed by measuring linear dichroism as a function of shear rate. Typically, this effect may only be observed for compositions having shear deformable particles in an amount of greater than about 20 weight percent of the total composition.

Figure 1:
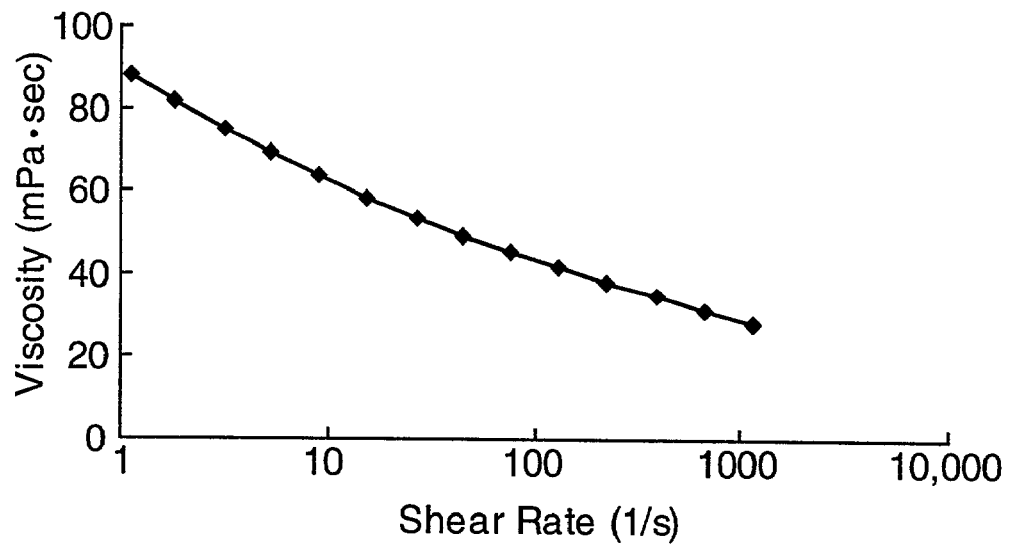
FIG. 1 is a plot of viscosity versus shear rate of the magenta ink of Example 3 according to the invention.
Figure 2:
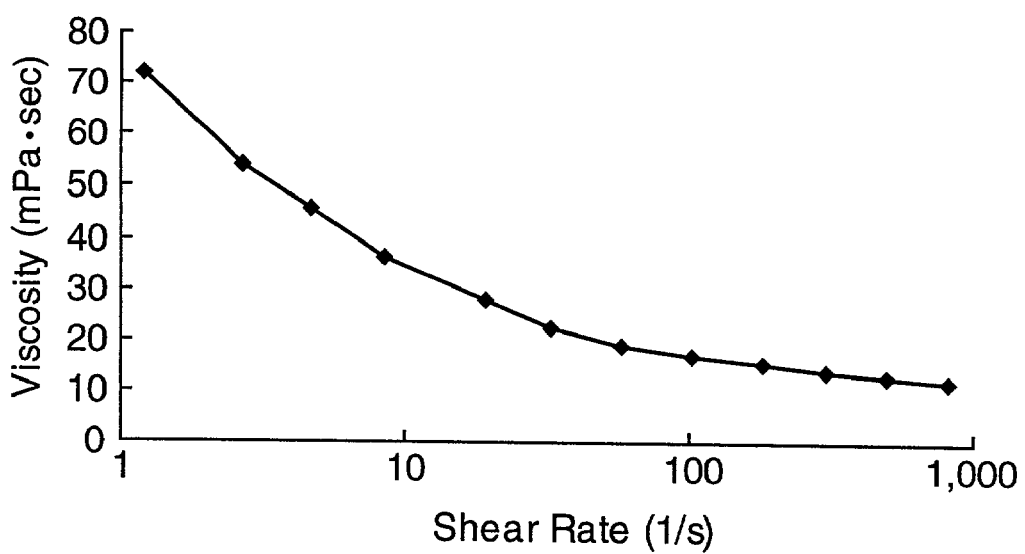
FIG. 2 is a plot of viscosity versus shear rate of a cyan ink of Example 5 according to the invention.
Figure 3:
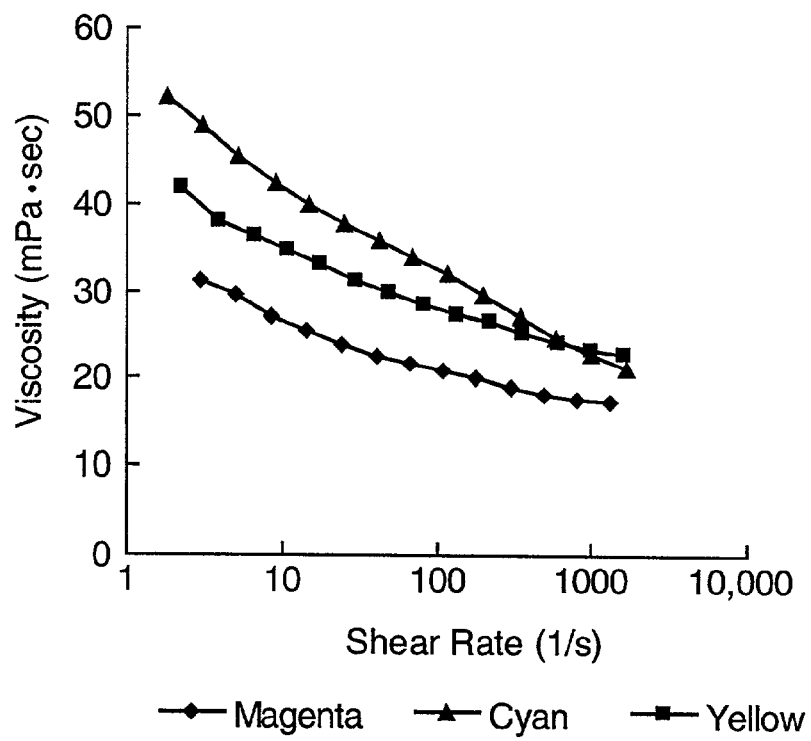
FIG. 3 is a plot of viscosity versus shear rate for inks of Examples 6-8 comprising an ink set according to the invention.

FIG. 1 depicts the shear thinning behavior of a magenta ink according to one embodiment of the invention as described in Example 1. Similarly, FIG. 2 depicts the shear thinning behavior of a cyan ink according to another embodiment of the invention as described in Example 5. According to another embodiment of the invention, FIG. 3 depicts the shear thinning behavior of an ink set consisting of three inks as described in Examples 6-8. For embodiments of the invention that exhibit shear thinning behavior, inks and compositions may be formulated with higher viscosities than are typically employed during ink jet printing.

Figure 4:
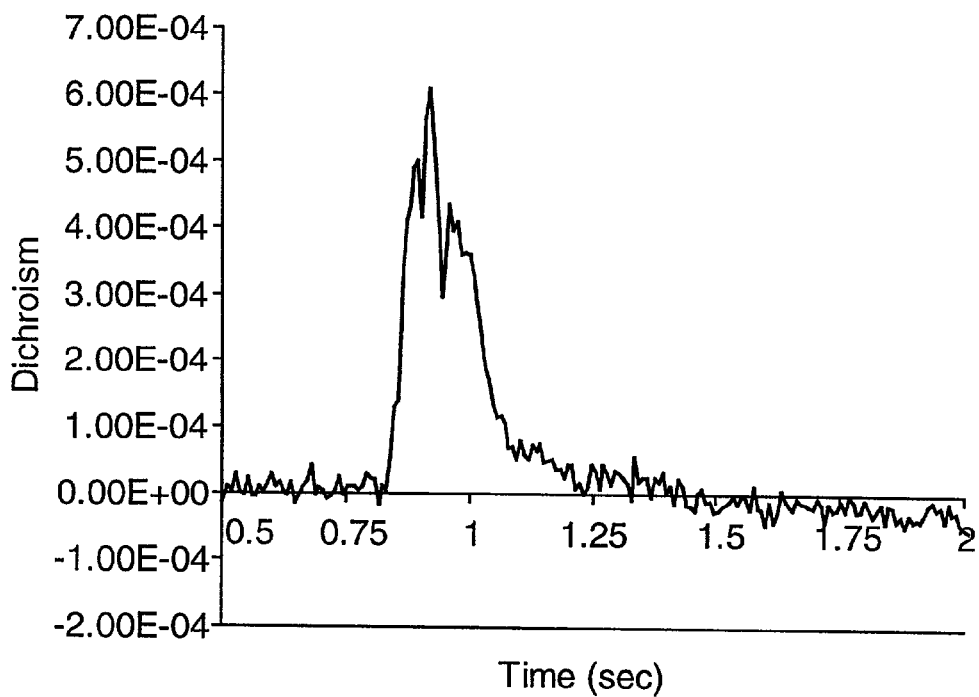
FIG. 4 is a plot of linear dichroism versus time for Dispersion D subjected to a step strain.

FIG. 4 illustrates the shear deformable nature of a dispersion of silyl-terminated sulfopoly(ester-urethane) particles useful in inks and compositions of the invention.

Aqueous Vehicle

The composition of the aqueous vehicle will vary greatly depending upon the specific ink jet printing method chosen. The aqueous vehicle will, of course, always include water, typically deionized water. For many applications, the aqueous vehicle will also include at least one water-soluble or water-miscible organic solvent. Selection of a suitable solvent or solvents depends upon requirements of the specific application, such as desired surface tension and viscosity, the selected particulate solid, etc.

The aqueous vehicle can be entirely water, or can contain water in combination with one or more organic solvents. Desirably, the aqueous vehicle contains water; e.g., at least 20 percent water by weight, more desirably from about 75 to about 100 percent water by weight.

In some embodiments, one or more organic co-solvents may be included in the aqueous vehicle, for instance, to control drying speed of the ink, to control surface tension of the ink, to allow dissolution of an ingredient (e.g., of a surfactant), or, as a minor component of any of the ingredients; e.g., an organic co-solvent may be present in a surfactant added as an ingredient to the ink. The organic co-solvent can be any of a number of organic solvents known to be useful with pigmented inks or pigment dispersions. Exemplary organic co-solvents include: alcohols such as methyl alcohol, ethyl alcohol, n-propyl alcohol, isopropyl alcohol, n-butyl alcohol, sec-butyl alcohol, t-butyl alcohol, iso-butyl alcohol, etc.; ketones or ketoalcohols such as acetone, methyl ethyl ketone, diacetone alcohol, etc.; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; glycol ethers having the trade designation DOWANOL, available from Dow Chemical Company (Midland, Mich.).

The amount of organic co-solvent and/or water within the aqueous vehicle can depend on a number of factors, such as the particularly desired properties of the ink dispersion such as the viscosity, surface tension, drying rate, etc., which can in turn depend on factors such as the type of ink jet printing technology intended to be used with the ink, such as piezo-type or thermal-type print heads, as well as the type of substrate the ink is intended to be printed on.

Silyl-terminated Sulfopoly (Ester-Urethane) Polymer

In some desired embodiments of the invention, the self-crosslinking polymer comprises a dispersed silyl-terminated sulfopoly(ester-urethane). Such sulfopoly(ester-urethane) polymers used in practice of the invention may be typically prepared as dispersions of particles in aqueous vehicles, and are described by the formula:

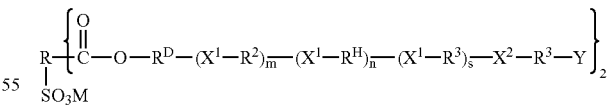

wherein

R can be a $C_6$-$C_{12}$ aryl triyl or $C_1$-$C_{20}$ aliphatic triyl group (trivalent aryl or aliphatic group) in which M is a cation, desirably M is Na, but M can be H, an alkali metal such as K, Li, an alkaline earth metal cation (e.g., Mg, Ca, or Ba), or a primary, secondary, tertiary, or quaternary ammonium cation such as ammonium, methylammonium, butylammonium, diethylammonium, triethylammonium, tetraethylammonium, and benzyltrimethylammonium cation; desirably when R is aliphatic it is an alkylene group;

can be, for example, but is not limited to:

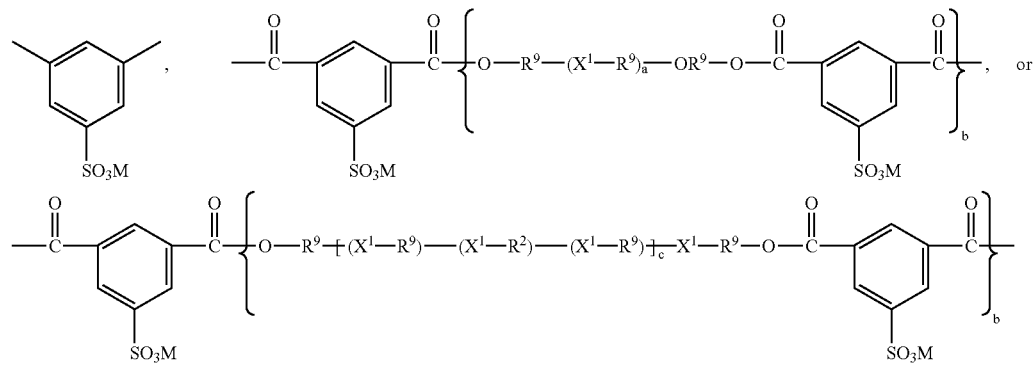

wherein $R^2$, $R^D$, $R^H$, $R^3$, $R^4$, $R^5$ are as defined hereinbelow, and each $R^9$ independently represents a linear or branched alkylene group having 2 to 12 carbon atoms, an arylene group having 6 to 10 carbon atoms, or may also comprise an oligomeric segment, such as, for example, a polyester or a polylactone segment;

each m independently represents 0 or 1, each n independently represents 0 or 1, each s independently represents s=0 or 1, with the proviso that, at least one of m or n must be equal to 1;

a is an integer from 1 to 10;
b is an integer from 0 to 4; and
c is an integer from 1 to 15.

The skilled artisan will recognize that the values for a, b, and c can vary over a broad range, depending on the molecular weight of the $R^1$ and $R^2$ segments. The important factor in determining the value of these variables is the sulfonate equivalent weight of the final poly(ester-urethane) molecule, which should fall in the range of 500 to 12,000 grams per equivalent. Generally speaking, the values of a and c will be larger when lower molecular weight $R^1$ (and $R^2$) segments are utilized and they will be smaller when oligomeric $R^1$ segments are utilized.

Each $R^D$ independently represents:

1) at least one of a divalent linear or branched organic group of 20 to 150 carbon atoms in units of 2 to 12 methylene groups and arylene groups of 6 to 10 carbon atoms separated by at least one of 1 to 50 catenary oxygen atoms and by 1 to 30 oxycarbonyl groups,

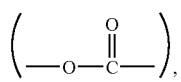

desirably at least one of 1 to 20 catenary oxygen atoms and by 1 to 10 oxycarbonyl groups, the organic group having a molecular weight of 400 to 2,500, desirably 600 to 1,000;

2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms, which organic group can be chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 4 to 6 carbons; or 3) the structure $\{-R^1(X^1-R^2-X^1-R^1)_p-\}$ where p is an integer from 1 to 5, produced by the reaction of a polyol with an isocyanate having the structure OCN—$R^2$—NCO to produce a segment having a molecular weight of from 500 to 4,000, desirably 800 to 2,000;

each $R^1$ independently represents a linear or branched alkylene group having 2 to 12 carbon atoms, or an arylene group having 6 to 10 carbon atoms;

each $X^1$ independently represents

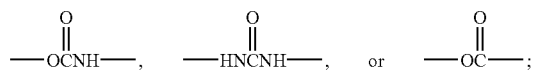

each $R^2$ independently represents an organic group desirably selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of at most 15 carbon atoms;

each $X^2$ independently represents

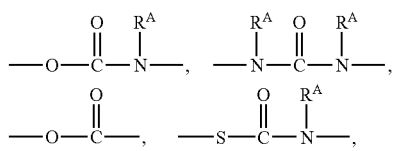

-continued

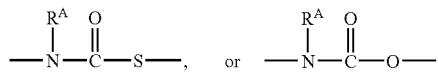

wherein each $R^4$ independently represents hydrogen or lower alkyl having 1 to 4 carbon atoms;

each $R^H$ independently represents a divalent hydrophobic group selected from divalent oligomeric siloxane groups having the structure

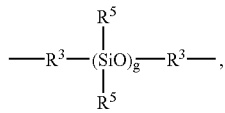

divalent organic groups having the structure

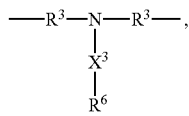

or divalent organic groups having one of the structures

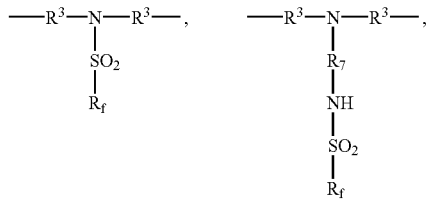

or quaternary salts thereof, wherein $R_f$ can be a fluorocarbon pendant group, as defined below; and each $R^3$ independently represents a divalent organic group, desirably linear or branched alkylene group having 2 to 12 carbon atoms, but it can also be an arylene, such as phenylene or an alkarylene group, each having 6 to 20 carbon atoms;

each Y independently represents H, an alkyl group having from 1 to 20 carbon atoms, an aryl group having from 6 to 10 carbon atoms, or

wherein each $R^4$ independently represents a monovalent lower alkyl group having from 1 to 4 carbon atoms, each $R^8$ is H or a monovalent lower alkyl group having from 1 to 4 carbon atoms, each z is independently 2 or 3, each w is independently 0 or 1 wherein z+w=3, with the proviso that at least one Y has the formula

each $R^5$ independently represents a monovalent group selected from the group consisting of alkyl groups of 1 to 12 carbon atoms, aryl having 6 to 10 carbon atoms, or aralkyl groups having 6 to 10 carbon atoms, with at least 70 percent of $R^4$ being methyl;

each g independently represents an integer of from 10 to 300;

each $X^3$ independently represents a covalent bond, a carbonyl group,

or a divalent amido group

each $R^6$ independently represents a monovalent group selected from the group consisting of alkyl groups of about 4 to about 60 carbon atoms, desirably 12 to 30 carbon atoms;

each $R^7$ independently represents a divalent group selected from the group consisting of alkylene groups of 2 to about 12 carbon atoms;

each $R_f$ independently represents a monovalent saturated fluoroaliphatic group having 6 to 12 carbon atoms, at least four of which are fully-fluorinated carbon atoms.

It is also understood that when the group $R^D$ (or its component groups $R^1$ and $R^2$), or the group $R^2$ contains branched alkylene components that these components constitute additional termini of the polymer or oligomer and as such, may themselves be terminated by at least one group Y, as defined hereinabove.

Typically, silyl-terminated sulfopoly(ester-urethane) compositions used in practice of the present invention have a sulfonate equivalent weight of about 500 to 12,000 g per equivalent, desirably 2,000 to 10,000 g per equivalent. Desirably, the silyl-terminated sulfopoly(ester-urethane) compositions may have a number average molecular weight of from about 2,000 up to about 50,000, more desirably in the range of from about 2,000 up to about 20,000, even more desirably in the range of from about 5,000 up to about 8,000.

Typically, silyl-terminated sulfopoly(ester-urethane) polymers may be prepared as particle dispersions in aqueous media. They are prepared by first combining a sulfonated polyester diol with a diisocyanate and, optionally, one or more additional diols in organic solvent (e.g., acetone or 2-butanone). Reaction stoichiometry is adjusted such that the product of the first step of the reaction is an isocyanate-terminated oligomer of about molecular weight of 7,000. Next, an aminoalkyltrialkoxysilane (e.g., 3-aminopropyltriethoxysilane) is added which reacts with the polymer bound isocyanate groups. Next, the reaction mixture is inverted into water, and the organic solvent is removed by distillation to give the silyl-terminated sulfopoly(ester-urethane) as a dispersion in water (typically >40 weight percent solids). Exemplary processes for the preparation of silyl-terminated sulfopoly(ester-urethane) compositions are given in U.S. Pat. Nos. 5,756,633 and 5,929,160, which processes are incorporated herein by reference.

Typically, dispersed silyl-terminated sulfopoly(ester-urethane) particles may be present in ink jet printable compositions of the invention in an amount of from about 0.1 weight percent up to about 50 weight percent or more, based on the total weight of ink composition. Desirably, silyl-terminated sulfopoly(ester-urethane) particles are present in an amount of from about 2 weight percent up to about 30 weight percent, more desirably from about 5 weight percent up to about 20 weight percent, based on the total weight of the ink composition.

The molecular weight limitations (if any) and useful concentration of dispersant for other applications can be determined by those skilled in the particular art of that application.

Ink jet printable compositions of the invention may, optionally, further comprise a colorant.

Optional Ingredients:

Colorant

Ink jet printable compositions of the invention may be formulated as inks that include one or more colorants. Suitable colorants include any known, commercially available pigments, dyes, or other color-providing material. The choice of colorant for use in the present invention depends on a number of factors including, but not limited to, the printing method used, and the end use of the ink composition and printed substrate having thereon the ink composition. For example, for outdoor signage, a colorant with a high degree of light fastness may be desirable. Suitable dyes and pigments, which may be of any color, such as black, red, blue, and yellow dyes and pigments may be found, for example in, THE COLOUR INDEX, $3^{rd}$ Ed., $4^{th}$ revision (vols. 1-9), Bradford, West Yorkshire, England, The Society of Dyers and Colourists, 1992. As used herein, the abbreviation "C. I." refers to "COLOUR INDEX".

The amount of colorant used in ink compositions of the present invention is typically less than about 25 volume percent based on the total weight of the ink composition. Desirably, the colorant, when present, is present in an amount of from about 0.1 volume percent to about 15 volume percent based on the total weight of the ink composition. More desirably, the colorant, when present, is present in an amount of from about 0.5 volume percent to about 5 volume percent based on the total weight of the ink composition.

For applications requiring outdoor durability and/or high image density, ink jet printable ink compositions of the invention desirably contain one or more pigments. Any known commercially available pigment may be used in the present invention as long as the pigment can be dispersed and does not negatively impact the ink composition.

Exemplary black pigments include, but are not limited to, carbon black pigments such as SPECIAL BLACK 4, SPECIAL BLACK 5, SPECIAL BLACK 6, SPECIAL BLACK 4A, COLOR BLACK FW 200, and COLOR BLACK FW2 pigments, available from Degussa Corporation (Ridgefield, N.J.); RAVEN 1200, RAVEN 1170, RAVEN 3500, and RAVEN 5750 carbon black pigments, available from Columbian Chemical Corp. (Atlanta, Ga.); MOGOL L and STERLING NS carbon black pigments, available from Cabot Corp. (Boston, Mass.); CARBON BLACK MA-100 pigment, available from Mitsubishi Kasei Corp. (Tokyo, Japan); and SUN UV FLEXO BLACK INK, a black pigment-containing UV-curable flexographic ink, available from Sun Chemical Co. (Fort Lee, N.J.).

Exemplary magenta pigments include, but are not limited to, QUINDO MAGENTA RV-6828 (C. I. Pigment Red 122), QUINDO MAGENTA RV-6831 (C. I. Pigment Red 122) presscake, QUINDO RED R-6713 PV 19, and QUINDO MAGENTA RV-6843 (C. I. Pigment Red 202) pigments, available from Bayer Corp. (Pittsburgh, Pa.); SUNFAST MAGENTA 122 and SUNFAST MAGENTA 202 pigments, available from Sun Chemical Corp. (Cincinnati, Ohio); and CINQUASIA MAGENTA B RT-343-D, a magenta pigment (C. I. Pigment Red 202), available from Ciba Specialty Chemicals (Basel, Switzerland), also known as MONASTRAL RED RT-343-D in the United States.

Exemplary cyan pigments include, but are not limited to, PALOMAR BLUE B-4810 (C. I. Pigment Blue 15:3), PALOMAR BLUE B-4710 (C. I. Pigment Blue 15: 1), and PALOMAR BLUE B-4900 pigments, available from Bayer Corp. (Pittsburgh, Pa.); and SUN 249-1284 pigment (C. I. Pigment Blue 15:3), available from Sun Chemical Corp. (Cincinnati, Ohio).

Exemplary yellow pigments include, but are not limited to, FANCHON FAST Y-5700 (C. I. Pigment Yellow 139) and FANCHON FAST YELLOW Y-5688 (C. I. Pigment Yellow 150) pigments, available from Bayer Corp. (Pittsburgh, Pa.); SUNBRITE YELLOW 14 presscake and SPECTRA PAC YELLOW 83 pigments, available from Sun Chemical Corp. (Cincinnati, Ohio); and IRGAZIN YELLOW 2RLT (C. I. Pigment Yellow 110), IRGAZIN YELLOW 2GLTN (C. I. Pigment Yellow 109), IRGAZIN YELLOW 2GLTE (C. I. Pigment Yellow 109), and IRGAZIN YELLOW 3RLTN (C. I. Pigment Yellow 110) pigments, available from Ciba Specialty Chemicals (Tarrytown, N.Y.).

Exemplary white pigments include, but are not limited to, white metal oxides such as titanium dioxide, zinc oxide, aluminum oxide and hydroxide, magnesium oxide, etc.; white metal sulfates, such as barium sulfate, zinc sulfate, calcium sulfate, etc., and white metal carbonates such as calcium carbonate, and the like.

A dispersant may, optionally, be used to disperse pigments in the aqueous vehicle. The dispersant is typically a synthetic polymer that is capable of adsorbing onto a hydrophobic pigment particle, and providing a hydrophilic shell around the pigment particle that permits it to be dispersed in the aqueous vehicle.

Exemplary dispersants include: polyvinyl alcohols; polyvinyl pyrrolidones; acrylic resins, such as polyacrylic acid, acrylic acid/acrylonitrile copolymers, potassium acrylate/acrylonitrile copolymers, vinyl acetate/acrylic ester copolymers, and acrylic acid/alkyl acrylate copolymers; styrene/acrylic acid resins, such as styrene/acrylic acid copolymers, styrene/methacrylic acid copolymers, styrene/methacrylic acid/alkyl acrylate copolymers, styrene/a-methylstyrene/acrylic acid copolymers, and styrene/α-methylstyrene/acrylic acid/alkyl acrylate copolymers; styrene/maleic acid copolymers; styrene/maleic anhydric copolymers; vinyl naphthalene/acrylic acid copolymers; vinylnaphthalene/maleic acid copolymers; vinyl acetate copolymers, such as vinyl acetate/ethylene copolymers, vinyl acetate/fatty acid vinylethylene copolymers, vinyl acetate/maleic ester copolymers, vinyl acetate/crotonic acid copolymers, and vinyl acetate/acrylic acid copolymers; polyurethanes; polyamine/fatty acid condensation polymers; and salts of the above polymers. Among them, copolymers of monomers having a hydrophobic group with monomers having a hydrophilic group, and polymers comprising monomers having both hydrophobic and hydrophilic groups are particularly preferred. Examples of salts of the above polymers include salts of the above polymers with diethylamine, ammonia, ethylamine, triethylamine, propylamine, isopropylamine, dipropylamine, butylamine, isobutylamine, triethanolamine, diethanolamine, aminomethylpropanol, morpholine, or the like. The weight average molecular weight of these copolymers is preferably 3,000 to 30,000, more preferably 5,000 to 15,000. According to the present invention, among the above polymers, styrene/acrylic acid resins, such as styrene/acrylic acid copolymer, styrene/methacrylic acid copolymer, styrene/methacrylic acid/alkyl acrylate copolymer, styrene/

α-methylstyrene/acrylic acid copolymer, and styrene/α-methylstyrene/acrylic acid/alkyl acrylate copolymer or salts of these copolymers are preferred.

Exemplary commercially available dispersants include those having the trade designations SOLSPERSE, available from Zeneca, Inc. (Wilmington, Del.) and JONCRYL, available from S.C. Johnson Co. (Racine, Wis.).

The content of the dispersant is typically 0.1 to 10 weight percent, preferably 0.5 to 4 weight percent, based on the total ink composition. In some embodiments of the present invention, a silyl-terminated sulfopoly(ester-urethane) may function as a dispersant, eliminating the need for an additional dispersant. In such instances, the amount of silyl-terminated sulfopoly(ester-urethane) is chosen based on the amount of silyl-terminated sulfopoly(ester-urethane) desired in the overall composition, and is typically greater than the amount needed to disperse the pigment.

Processes for preparing aqueous pigment dispersions are well known in the ink art and are described, for example, in U.S. Pat. Nos. 5,679,138; 5,891,231; and European Patent Publication EP 889 102 A2.

Alternatively, or in combination, pigment dispersions may be obtained from a commercial source. Exemplary commercially available pigment dispersions include those having the trade designation HOSTAFINE, available from Clariant Corp. (Charlotte, N.C.), including HOSTAFINE YELLOW HR and HOSTAFINE BLUE B2G, and the like; pigment dispersions having the trade designation LUCONYL and BASOFLEX, available from BASF Corp. (Mount Olive, N.J.); LUCONYL YELLOW 1250, BASOFLEX PINK 4810, LUCONYL BLUE 7050, and the like; pigment dispersions, available from Keystone Aniline Corp. (Chicago, Ill.), such as KEYSTONE JET PRINT MICRO BLACK (C. I. Pigment Black 7), KEYSTONE JET PRINT MICRO BLUE (C. I. Pigment Blue 15:3), KEYSTONE JET PRINT MICRO MAGENTA (C. I. Pigment Red 122), KEYSTONE JET PRINT MICRO YELLOW (C. I. Pigment Yellow 13), and the like; pigment dispersions having the trade designation BAYSCRIPT, available from Bayer Corp. (Pittsburgh, Pa.), such as BAYSCRIPT YELLOW P PZD 101440 (C. 1. Pigment Yellow 74), BAYSCRIPT MAGENTA P PAD 101090 (C. I. Pigment Red 122), and the like; pigment dispersions having the trade designation SUNSPERSE, available from Sun Chemical Corp. (Fort Wayne, N.J.), such as SUNSPERSE YELLOW YHD-9439 (C. I. Pigment Yellow 17), FLEXIVERSE 11 WFD-5006 white pigment dispersion, and the like; pigment dispersions having the trade designation HEUCOSPERSE, available from Heucotech, Ltd. (Fairless Hills, Pa.). Other pigment dispersions can also be selected.

Desirably, the pigment particle size is as small as possible to enable a stable colloidal suspension of the particles in the liquid vehicle and to prevent clogging of the print head nozzles when the ink is used in an ink jet printer. Typically, particle average diameters are from about 0.001 to about 5 micrometers, and more desirably from about 0.05 to about 1 micrometer, although the particle size can be outside these ranges. Within the ink compositions of the present invention, the pigment is present in any effective amount to achieve the desired degree of coloration.

Typically, when pigment is used as colorant, the pigment is present in an amount of from about 0.1 to about 8 weight percent of the ink, and preferably from about 2 to about 7 weight percent of the ink, although the amount can be outside these ranges.

For applications where lightfastness is not required, ink compositions of the invention may contain one or more dyes. Any known commercially available dye may be used in the present invention as long as the dye does not negatively impact the self-crosslinking properties of the silyl-terminated sulfopoly(ester-urethane) of the ink composition. Useful dyes may be an organic dye. Organic dye classes include, but are not limited to, triarylmethyl dyes, such as Malachite Green Carbinol base {4-(dimethylamino)-a-[4-(dimethylamino)phenyl]-a-[phenylbenzene-methanol}, Malachite Green Carbinol hydrochloride {N-4-[[4-(dimethylamino)phenyl]-phenylmethylene]-2,5-cyclohexyldien-1-ylidene]-N-methyl-methanaminium chloride or bis[p-(dimethylamino)phenyl]phenyl-methylium chloride}, and Malachite Green oxalate {N-4-[[4-(dimethylamino)phenyl] phenylmethylene]-2,5-cyclohexyldien-1-ylidene]-N-methylmethanaminium chloride or bis[p-dimethylamino)phenyl] phenylmethylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and B-Naphthol Orange; thiazine dyes, such as Methylene Green, zinc chloride double salt [3,7-bis(dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH {6-amino-2-[(hydrazinocarbonyl)amino]-2,3-dihydro-1,3-dioxo-1H-benz[de]iso quinoline-5,8-disulfonic acid dilithium salt}; azine dyes, such as Janus Green B {3-(diethylamino)-7-[[4-(dimethylamino)phenyl]azo]-5-phenylphenazinium chloride}; cyanine dyes, such as Indocyanine Green {Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or C. I. Vat Blue 1; 2-(1,3-dihydro-3-oxo-2H-indol-2-ylidene)-1,2-dihydro-3H-indol-3-one}; coumarin dyes, such as 7-hydroxy-4-methylcoumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydrochloride pentahydrate; Hoechst Celanese Corp. (Chester, S.C.)]; paraquinoidal dyes, such as hematoxylin {7,11b-dihydrobenz[b]indeno[1,2-d]pyran-3,4,6a,9,10(6H)-pentol}; fluorescein dyes, such as fluoresceinamine (5-aminofluorescein); diazonium salt dyes, such as Azoic Diazo No.10 (2-methoxy-5-chlorobenzenediazonium chloride, zinc chloride double salt); azoic diazo dyes, such as Azoic Diazo No. 20 (4-benzoylamino-2,5-diethoxybenzene diazonium chloride, zinc chloride double salt); phenylenediamine dyes, such as C. I. Disperse Yellow 9 [N-(2,4-dinitrophenyl)-1,4-phenylenediamine or Solvent Orange 53]; diazo dyes, such as C. I. Disperse Orange 13 [1-phenylazo-4-(4-hydroxyphenylazo)naphthalene]; anthraquinone dyes, such as C. I. Disperse Blue 3 [1-methylamino-4-(2-hydroxyethylamino)-9,10-anthraquinone], C. I. Disperse Blue 14 [1,4-bis(methylamino)-9,10-anthraquinone], and C. I. Mordant Black 13; trisazo dyes, such as C. I. Direct Blue 71 (3-[(4-[(4-[(6-amino-1-hydroxy-3-sulfo-2-naphthalenyl)azo]-6-sulfo-1-naphthalenyl)azo]-1-naphthalenyl)azo]-1,5-naphthalenedisulfonic acid tetrasodium salt); xanthene dyes, such as 2,7-dichlorofluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2-)—$N^{29}$,$N^{30}$, $N^{31}$,$N^{32}$]copper); carotenoid dyes, such as trans-β-carotene (Food Orange 5); carminic acid dyes, such as Carmine, the aluminum or calcium-aluminum lake of carminic acid (7-a-

D-glucopyranosyl-9,10-dihydro-3,5,6,8-tetrahydroxy-1-methyl-9,10-diox o-2-anthracenecarbonylic acid); azure dyes, such as Azure A [3-amino-7-(dimethylamino)phenothiazin-5-ium chloride or 7-(dimethylamino)-3-imino-3H-phenothiazine hydrochloride]; and acridine dyes, such as Acridine Orange [C. I. Basic Orange 14; 3,8-bis(dimethylamino) acridine hydrochloride, zinc chloride double salt] and Acriflavine (Acriflavine neutral; 3,6-diamino-10-methylacridinium chloride mixture with 3,6-acridinediamine).

When dye is used as colorant, the amount of dye used is desirably in the range of from about 0.1 volume percent to about 15 volume percent, more desirably 0.5 volume percent to about 5 volume percent, based on the total weight of the ink composition.

In some embodiments, as in the case of clear coat compositions, a colorant is typically omitted.

Additional Dispersed Polymers

Additional dispersed polymers, which may or may not be shear deformable, may be added to compositions of the invention to adjust cured film properties. If employed, the total solids resulting from such polymeric dispersions may be typically present in an amount of from about 0.1 to about 3 times the weight of the silyl-terminated sulfopoly(esterurethane) polymer.

Exemplary additional dispersed polymers (i.e., polymeric dispersions) include acrylic resin dispersions having the trade designation RHOPLEX (e.g., RHOPLEX AC-2507, RHOPLEX AC-347, RHOPLEX AC-261, RHOPLEX AC-264, RHOPLEX AC-2508, RHOPLEX SG-10M, RHOPLEX SG-20, RHOPLEX E-3131, RHOPLEX MILTI-LOBE 200, RHOPLEX B 1604, RHOPLEX 3479, DURA-PLUS 3 acrylic resins), available from Rohm & Haas Co. (Philadelphia, Pa.); styrene/acrylic resin dispersions, such as those having the trade designation JONCRYL (e.g., JON-CRYL 1915, JONCRYL 1972, JONCRYL 1532, JONCRYL 537), available from Johnson Polymer, Inc. (Sturtevant, Wis.); polyurethane dispersions (e.g., IMPRANIL DLN D A247 and IMPRANIL DLN D A247), available from Bayer Corp. (Pittsburgh, Pa.).

Surfactant

Compositions of the invention may employ anionic, cationic, nonionic, or amphoteric surfactants, which may be present in the amount of 0.01-5 percent and desirably 0.2-2 percent, based on the total weight of the ink. Exemplary ionic surfactants include those having the trade designation AEROSOL, available from American Cyanamid (West Paterson, N.J.), such as AEROSOL OT; and DARVAN No. 1 and DARVAN No. 7 surfactants, both available from T. T. Vanderbilt Co. (Norwalk, Conn.). Exemplary nonionic surfactants include those having the trade designation TRITON, available from Union Carbide Corp. (Danbury, Conn.), such as TRITON X-100, TRITON X-102, TRITON X-114, TRITON X-101, and TRITON CF-10 surfactants; surfactants having the trade designation SURFYNOL, available from Air Products and Chemicals (Allentown, Pa.), such as SUR-FYNOL CT-136 (a mixture of anionic and nonionic surfactants), SURFYNEL 104, SURFYNOL 465, and SUR-FYNOL TG; surfactants having the trade designation TERGITOL, available from Union Carbide Corp., such as TERGITOL NP-9 and TERGITOL NP-10; organosilicone surfactants, including those having the trade designation SILWET, available from OSi Specialties, Inc. such as SIL-WET L-77, and the like.

Useful surfactants may comprise fluorinated surfactants. Particularly desirable fluorochemical surfactants are described in Applicants' commonly assigned, pending U.S. application Ser. No. 09/911,279 (Ylitalo et al.), filed on Jul. 23, 2001, which surfactants are incorporated herein by reference.

The surfactants can comprise from about 0.01 to about 6 weight percent, desirably from about 0.05 to about 4 weight percent, more desirably from about 0.1 to about 1 weight percent of the aqueous vehicle.

Humectant

A humectant is employed in the ink jet composition of the invention to help prevent the ink from drying out or crusting in the orifices of the print head.

Examples of humectants which can.be used include polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol, and thioglycol; lower alkyl mono- or di-ethers derived from alkylene glycols, such as ethylene glycol mono- methyl or mono-ethyl ether, diethylene glycol mono-methyl or mono-ethyl ether, propylene glycol monomethyl or mono-ethyl ether, triethylene glycol mono-methyl or mono-ethyl ether, diethylene glycol di-methyl or di- ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds, such as dimethyl sulfoxide and tetramethylene sulfone. Desirably, the humectant comprises diethylene glycol, glycerol, or diethylene glycol monobutylether.

Additional Ingredients

To enhance durability of a printed image graphic, especially in outdoor environments exposed to sunlight, a variety of commercially available stabilizing chemicals can be added optionally to compositions of the present invention. These stabilizers can be grouped into the following categories: heat stabilizers; ultraviolet light stabilizers; and free-radical scavengers.

Heat stabilizers may be used to protect the resulting image graphic against the effects of heat. Exemplary, commercially available, heat stabilizers include MARK V1923 stabilizer, available from Witco Corp. (Houston, Tex.); and SYNPRON 1163, FERRO 1237, and FERRO 1720 stabilizers, available from Ferro Corp. (Cleveland, Ohio). Such heat stabilizers can be present in amounts ranging from about 0.02 to about 0.15 weight percent.

Ultraviolet light stabilizers may be used to protect the resulting image graphic against the effects of light. Exemplary, commercially available, light stabilizers include UVI-NOL 400, available from BASF Corp. (Parsippany, N.J.) and TINUVIN 900, available from Ciba Specialty Chemicals Corp. (Tarrytown, N.Y.) and can be present in amounts ranging from about 0.1 to about 0.25 weight percent of the total ink.

Free-radical scavengers can be present in an amount from about 0.05 to about 0.25 weight percent of the total ink. Exemplary scavengers include hindered amine light stabilizer (HALS) compounds, hydroxylamines, sterically hindered phenols, and the like. Preferably, the free-radical scavenger is regenerating such as existing with the HALS compounds. Exemplary, commercially available HALS compounds include TINUVIN 292 hindered amine light stabilizer, available from Ciba Specialty Chemicals Corp. (Tarrytown, N.Y.) and CYASORB UV3581, available from Cytec Industries (West Paterson, N.J.).

Additional optional ingredients may include biocides such as those sold under the trade designations DOWICIDE, available from Dow Chemical Company (Midland, Mich.);

NUOSEPT, available from Huls America, Inc. (Piscataway, N.J.); OMIDINE, available from Olin Corp. (Cheshire, Conn.); NOPCOCIDE, available from Henkel Corp. (Ambler, Pa.); TROYSAN, available from Troy Chemical Corp. (Newark, N.J.); sodium benzoate; fungicides, sequestering agents such as EDTA; colloidal inorganic particles including, for example, colloidal silicas sold under the trade designation HIGHLINK, available from Clariant Corp. (Charlotte, N.C.); and other known additives, such as defoamers, conductivity enhancing agents, anti-kogation agents, corrosion inhibitors, pH buffers, coalescing agents, polymeric binders including water soluble polymers and water dispersible latex emulsions, thickeners, thixotropic agents, surfactants, coating aids, sequestering agents, viscosity modifiers, and the like.

Ink Formulation and Processing

In general, the amounts of ingredients such as colorant, water, optional organic co-solvents and additives included in ink jet inks are known and understood in the ink jet ink dispersion art. The amount of each ingredient present in a particular ink of the invention can depend on a number of factors, including, for example, the identity of the ingredients (pigment, solvent, silyl-terminated sulfopoly(ester-urethane), and any optional dispersant), the intended application of the ink jet ink (e.g., the intended receptor), among other factors. Although amounts of ingredients outside the following ranges can also be useful, examples of useful amounts can be as follows: pigment can be included in the ink, e.g., in an amount in the range from about 0.5 to 10 weight percent of the ink jet ink dispersion.

The quantity of pigment dispersant used can be any effective amount, i.e., an amount effective to disperse the pigment and stabilize the dispersion. Generally, the dispersant can be present in the ink in an amount that depends on the amount of pigment, with the amount of dispersant being, for example, an amount in the range from about 1 up to about 300 weight percent of the pigment, with an amount in the range from about 10 up to about 200 weight percent being preferred.

Ink jet printable compositions, including inks, may typically have a total solids content of from about 1 to about 60 weight percent of the total composition, although higher values may be achievable with proper selection of ingredients. Desirably, compositions, including inks, of the present invention have a solids content of greater than 20 weight percent, and more desirably greater than 30 weight percent.

The inks of the invention can be prepared from the above ingredients using compounding processes generally known to be useful with processing pigment dispersions. Some methods make use of ultrasonic energy to achieve mixing and particle deflocculation, while other methods use media mills such as ball mills, sand mills, or attritors. Media mills achieve acceptable pigment dispersion by subjecting a pigment mixture to high intensity microshearing and cascading which breaks down agglomerations of the pigment particles.

One method for making the inks of the invention is disclosed in U.S. Pat. No. 5,679,138, the disclosure of which is hereby incorporated by reference. In general, it is desirable to make pigmented ink jet inks in the form of a concentrated mill grind, which is subsequently diluted to the appropriate concentration for use in the ink jet printing system. This technique permits preparation of a greater quantity of pigmented ink from the equipment. The mill grind can be diluted with either additional water or water-miscible solvents to make a mill grind of the desired concentration. By dilution, the ink is adjusted to the desired viscosity, color strength, hue, saturation density and print area coverage for the particular application.

Homogenizers and emulsifiers can also be used for ink compounding. These systems generally function by forcing a premix of solids and liquids to collide against a surface, or to collide against itself.

The conventional two-roll mill and three-roll mill processing technologies can be effective techniques for dispersing pigment particles if the materials can be formulated into highly viscous paste for processing, then followed by a let-down step to produce the final ink.

In still another processing method, a pigment dispersion can be forced through a series of small nozzles having diameters on the order of about 150 micrometers to about 1,000 micrometers. Such systems must be able to withstand very high pressures at high fluid velocities. Three different configurations for such systems may be used: a) a "wedge" configuration with orifices of decreasing diameter; b) a "wedge" configuration within which the orifices have cavitation enhancement devices; and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks. Examples of these processes can be found in U.S. Pat. Nos. 5,482,077 (Serafin) and 5,852,076 (Serafin et al.); and PCT Patent Publication Nos. WO 96/14925 and WO 96/14941 (both Serafin et al.), which processes are incorporated by reference herein.

After an ink has been processed, it can be filtered using any appropriate filter, for example, a 5 micrometer WHATMAN POLYCAP 36 HD cartridge type filter, available from Arbor Technology (Ann Arbor, Mich.). A pump, such as a MASTERFLEX peristaltic pump, available from Barnant Co. (Barrington, Ill.) can be used to feed the ink through the filter. A flow rate of about 120 milliliters per minute with a back pressure of about 3 psi (0.21 kg/cm$^2$ metric) is preferred.

The inks of the invention are useful within ink jet printing applications. As such, the inks may desirably be contained (i.e., packaged) within an ink jet printer cartridge, or packaged in bulk containers. Typically, the inks flow freely through any conduits in any cartridge, if present, tubing, if present, and nozzle orifices under ink jet printing conditions. The inks also desirably exhibit a reduced propensity of pigment agglomeration, reduced settling out of the pigment from the ink dispersion, and reduced clogging of ink jet print head nozzles (as opposed to inks not suitable for use in ink jet applications). Although values outside of the following ranges can be useful (especially if a heated piezo-electric print head is employed), the ink jet inks can generally have a viscosity in the range from 1 to about 20 mpa·s, desirably from about 1 to 10 mpa·s, more desirably from about 1 to 5 mPa·s, at a shear rate of 1000 s$^{-1}$, and a surface tension in the range from about 20 to 70 mN/meter, desirably from about 25 to 60 mN/meter.

Desirably, in order to provide storage stability, the pH of ink jet printable aqueous compositions of the invention is between about 6 and about 8, although values outside this range may be used depending on the application requirements.

Ink Sets

Ink jet printable inks prepared according to the invention may be prepared in a variety of colors including, but not limited to, cyan, magenta, yellow, black, white, red, blue, orange, violet, and green. Inks thus prepared may be combined prior to, or during, printing thereby enabling a wide color gamut.

Substrates

The ink jet printable aqueous compositions of the invention may be used to print on a wide variety of substrates, which may be porous or non-porous. Exemplary substrates include porous and non-porous plastic films and laminates including, but not limited to, films and laminates of polycarbonate, polyester, polyethylene terephthalate, polymethyl methacrylate, polyethylene, polyvinyl chloride, polyurethane, and especially including film substrates, which may be adhesive backed, retroreflective, microreplicated or otherwise, having the trade designation SCOTCHCAL, SCOTCHLITE, CONTROLTAC, or PANAFLEX, available from Minnesota Mining and Manufacturing Company (St. Paul, Minn.); textiles such as woven and nonwoven fabrics comprising cotton, silk, linen, nylon, acrylic, polyolefin, rayon, acetate and polyester fibers and their blended yarn fabrics, and the like; papers, such as bond paper, copier paper, and other cellulosic and synthetic papers, and the like; glass; metal; etc.

If one or more dyes are employed as colorant for textile printing applications, the type of ink used for dyeing must be appropriate for the type of fabric. For example, cotton, silk, linen and rayon can be recorded upon using inks containing reactive dyes, and nylon and occasionally silk are recorded upon using inks containing acid dyes. Acetate and polyester are recorded with inks containing disperse dyes. Before fabrics of cotton, and the like, are dyed with reactive dyes, the fabrics must be padded with an aqueous solution of sodium carbonate or sodium bicarbonate to alkalify the fabrics.

Printing Methods

Compositions of the invention may be printed using an ink-jet printer to form ink jetted features, e.g., films or patterns, on a desired substrate. Various types of inkjet printers are known including thermal ink jet printers, continuous ink jet printers, and piezoelectric ink jet (i.e., piezo ink jet) printers.

The ink jet printable compositions of the invention may be printed by any known ink jet method, including thermal, bubble-jet, and piezo-electric ink jet techniques.

Ink jet printed images are typically characterized by a plurality of regularly spaced dots. The individual dots may be of the same or different colors, and be coalesced or distinct. Resolution of ink jet printed images is typically measured in terms of dots per inch (dots per cm), with resolutions up to 2,000 dots per inch (790 dots/cm) or more being readily obtainable with current technology.

For ink jet applications, substantially Newtonian characteristics at least while being jetted are especially desired over non-Newtonian fluids that exhibit elastic behavior. Elasticity of a fluid tends to cause extension thickening behavior, which is known to prevent jetting of inks, even when the low viscosity requirement is satisfied.

Another reason for using fluids with at least substantially Newtonian viscosity properties is that jetting is typically achieved at shear rates of approximately $1 \times 10^6$ s$^{-1}$, while ink refill from the reservoir into the ink jet head channels takes place at 100-1000 s$^{-1}$. A highly elastic composition may have much higher viscosity at the refill rate than at the jetting rate. This tends to slow refill, compromising print head performance. Elasticity and its drawbacks can be avoided by formulating fluid compositions that exhibit little or no elasticity at the jetting temperature and shear conditions.

Without wishing to be bound by theory, it is believed that the shear deformable particles in ink jet printable compositions may cause extension thinning and/or shear thinning behavior during printing.

Thermal ink jet printers and print heads are readily commercially available from printer manufacturers such as Hewlett-Packard Corp. (Palo Alto, Calif.); Canon USA, Inc. (Lake Success, N.Y.); Encad, Inc. (San Diego, Calif.); Lexmark International (Lexington, Ky.); and others.

Embodiments of ink jet printing devices with versatile printing capabilities are also described in Assignee's co-pending patent application U.S. application Ser. No. 09/751,142 (Tokie), filed Dec. 29, 2000.

In order to improve the productivity of graphic article production, the method of the present invention desirably employs a piezoelectric ink-jet printer. Piezo ink jet print heads are commercially available from Trident International, Inc. (Brookfield, Conn.); U.S. Epson Inc. (Torrance, Calif.); Hitachi Data Systems Corp. (Santa Clara, Calif.); Xaar Americas (Schaumberg, Ill.); Epson America, Inc. (Long Beach, Calif.); Spectra, Inc. (Hanover, N.Y.); Idanit Technologies, Ltd. (Rishon Le Zion, Israel); and others. Such print heads are used in piezo ink jet printers commercially available from Idanit Technologies, Ltd. (Rishon Le Zion, Israel); Xerox Corp. (Stamford, Conn.); and Raster Graphics, Inc. (San Jose, Calif.); VUTEk, Inc. (Meredith, N.H.); Olympus Optical Co. Ltd. (Tokyo, Japan); and others.

Desirably, when printing aqueous compositions of the invention with a piezo ink jet printer, the print head may be optionally heated to allow jetting of materials too thick to be jetted under ambient conditions. Typically such heads should not be heated to a point at which the jettable composition becomes unstable.

Once printed, the aqueous compositions of the invention are typically dried, during which film forming and crosslinking of the silyl-terminated sulfopoly(ester-urethane) particles occurs. Heating may optionally be employed to facilitate the process.

The utility and advantages of this invention will be illustrated in the examples below.

EXAMPLES

The following abbreviations, materials and procedures are used in the examples that follow:

"NM" as it appears in the Tables below means not measured;

"DMSSIP" refers to dimethyl 5-sodiosulfoisophthalate, available from E. I. du Pont de Nemours (Wilmington, Del.);

"HMDI" means 4,4'-methylenebis(cyclohexyl isocyanate), available from Aldrich Chemical Co. (Milwaukee, Wis.);

"IPDI" means isophorone diisocyanate, available from Aldrich Chemical Co. (Milwaukee, Wis.); and "Wt. %" means percent by weight.

Cyan millbase was made by combining 7.64 parts DAXAD 15LS (condensed naphthalene sulfonate dispersant, available from Hampshire Chemical Corp., Deer Park, Tex.), 7.64 parts deionized water, 17.88 parts diethylene glycol, and 66.84 parts SUNFAST BLUE 15:3 presscake (available from Sun Chemical Corp., Cincinnati, Ohio), and processing the mixture with a 3-roll mill to achieve the consistency of a paste (median pigment particle size was <0.15 micrometers, max. particle size <0.60 micrometers);

Magenta millbase was made by combining 15.51 parts DOWFAX 8390 (anionic surfactant, available from Dow Chemical Corp., Midland, Mich.), deionized water as required to maintain processability, 15.51 parts diethylene glycol, and 66.98 parts QUINDO MAGENTA RV 6831 presscake (available from Bayer Corp., Pittsburgh, Pa.), and processing the mixture with a 3-roll mill to achieve the consistency of a paste (median pigment particle size was <15 micrometers, max. particle size <0.60 micrometers);

CAB-O-JET 300 is a trade designation for a jet black aqueous pigment dispersion, available from Cabot Corp. (Boston, Mass.);

DOWANOL PnP is a trade designation for propylene glycol n-propyl ether, available from Dow Chemical (Midland, Mich.);

epsilon-Caprolactone and TONE 0201 which is a trade designation for polycaprolactone diol ($M_n$=530 g/mol; hydroxyl no. 212 mg KOH/g) are available from Dow Chemical (Midland, Mich.);

HIGHLINK OG 1-32 is a trade designation for a 30 weight percent colloidal silica in ethylene glycol, available from Clariant Corp. (Charlotte, N.C.);

HOSTASOL YELLOW 3G is a fluorescent yellow dye available from Clariant Corp. (Charlotte, N.C.);

JETSPERSE QJD-3122 magenta, JETSPERSE YJD-3174 yellow, JETSPERSE BJD-3115 cyan, and JETSPERSE LJD-309 black are trade designations for pigment dispersions, available from Sun Chemical Corp., Colors Group (Cincinnati, Ohio);

JONCRYL 537 and JONCRYL 1972 are trade designation for an aqueous styrene-acrylic polymer dispersions (approximately 40 weight percent solids) available from Johnson Polymer, Inc. (Sturtevant, Wis.);

Polyethylene glycol 400 is available from Aldrich Chemical Co. (Milwaukee, Wis.);

RHOPLEX SG-10M is a trade designation for an aqueous acrylic dispersion available from Rohm & Haas Co. (Philadelphia, Pa.);

SCOTCHLITE DG-LPD SERIES 3970 REFLECTIVE SHEETING, SCOTCHLITE HI SERIES 3870 REFLECTIVE SHEETING, SCOTCHLITE REFLECTIVE SHEETING #510, SCOTCHLITE REFLECTIVE SHEETING #780, CONTROLTAC 180-10 VINYL FILM, CONTROLTAC 680-10 VINYL FILM, CONTROLTAC PLUS GRAPHIC MARKING FILM WITH COMPLY PERFORMANCE #3540C, CONTROLTAC PLUS VINYL FILM #3650-114, PANAFLEX 931 FLEXIBLE SUBSTRATE, and PANAFLEX 945 FLEXIBLE SUBSTRATE are trade designations for film substrates, available from Minnesota Mining and Manufacturing Company (St. Paul, Minn.);

SILWET L-77 is a trade designation for a silicone surfactant, available from OSi Specialties, Inc. (Danbury, Conn.);

TERGITOL 15-S-7 and TERGITOL TMN-6 are trade designations for nonionic surfactants, available from Dow Chemical Company (Midland, Mich.);

Wire wound coating rods (No. 8), available from R D Specialties (Webster, N.Y.). Nominal wet coating thickness was 0.8 mils (20 micrometers);

Materials and equipment not specifically listed herein are readily available from general chemical and scientific supply vendors such as Sigma-Aldrich Chemical Company (Milwaukee, Wis.); Alfa Chemical Co. (Ward Hill, Mass.); and the Fisher Scientific Company (Pittsburgh, Pa.);

Surface tension of the inks was measured using a Kruss tensiometer, available from Kruss USA (Charlotte, N.C.) according to the Wilhemy plate method;

Viscosity was measured at 25° C. using a Bohlin Model No. CVO 120 viscometer, cup and bob configuration (CS C25 cup), available from Bohlin Instruments Ltd. (Cirencester, Gloucestershire England); and Reflectance optical density was measured using a Gretag SPM55 spectrophotometer, available from Gretag Imaging, Inc. (Rochester, N.Y.), using background subtraction. Prior to performing the measurement, the ink was coated onto the substrate using a No. 8 wire wound rod and was dried at 80° C. for 5 minutes.

General Procedure For Making Inks

Ingredients were combined in a glass jar and mixed by rolling the jar on a roll mill for 24 hours. The resultant inks were then filtered through a WHATMAN GLASS MICROFIBER GD/X Syringe Filter (2.7 um/25 mm diameter), available from Whatman International, Ltd. (Maidstone, England).

The polymer dispersions described in Preparative Examples 1-10 were nominally prepared at 40 weight percent solids.

Preparative Example 1

Preparation of Sulfopolyester Diol Precursor

A mixture of DMSSIP (337.3 g, 1.14 mol), diethylene glycol (483 g, 4.55 mol), and zinc acetate (0.82 g) was heated to 180° C. and the methanol by-product was distilled from the reaction mixture. After 4.5 hours, proton nuclear magnetic resonance (i.e., $^1$H NMR) analysis of the reaction product showed that less than 1 percent residual methyl ester was present in the product. Dibutyltin dilaurate (1.51 g, 2.4 mmol) was added to the reaction mixture, the temperature held at 180° C., and epsilon-caprolactone (1753 g, 15.36 mol) was added portion-wise over about a 30-minute period. When addition was complete, the reaction mixture was held at 180° C. for 4 hours, then cooled to afford the product, a polycaprolactone sodium sulfoisophthalate (abbreviated hereinafter as "PCPSSIP"), which had a hydroxyl equivalent weight of 370.

Preparative Example 2

An aqueous dispersion of a silyl-terminated sulfopoly (ester-urethane) was prepared by combining in a 1-liter 3-neck round bottom flask, 63.05 g (0.085 mol) of PCPSSIP, which was prepared as described in Preparative Example 1; 18.86 g (0.036 mol) TONE 0201; 8.94 g (0.14 mol) ethylene glycol; 75.87 g (0.29 mol) of HMDI; 0.13 g (0.002 mol) dibutyltin dilaurate; and 90 mL of methyl ethyl ketone. The mixture was stirred and heated to 80° C. for 4 hours, after which time a solution of 11.91 g (0.054 mol) 3-aminopropyltriethoxysilane in 83 mL methyl ethyl ketone was added to the flask and the mixture was stirred at 55° C. for an additional 15 minutes. As the mixture was vigorously stirred, 260 mL of water was added to the flask over a 15-minute period. The flask was then fitted with a distillation head and a condenser and the methyl ethyl ketone was distilled out of the flask under reduced pressure to afford a dispersion of a silyl-terminated sulfopoly(ester-urethane) in water, 34 percent solids by weight. This polymer dispersion was designated Dispersion A.

Preparative Examples 3-8

Additional dispersions of silyl-terminated sulfopoly(ester-urethane) polymers with different molar ratios of monomers and comprising different diisocyanate precursors and different end caps were prepared according to the method of Preparative Example 2. In Preparative Examples 3-8, either IPDI or HMDI was used as the diisocyanate, and proportions of n-butylamine were substituted for 3-aminopropyltriethoxysilane. The polymer compositions of Dispersions B-G are given in Table 1.

TABLE 1

| Dispersion | PCPSSIP (g) | TONE 0201 (g) | Ethylene glycol (g) | Diisocyanate | Wt. of Diisocyanate (g) | A1100 (g) | n-Butyl-amine (g) | Solids (wt. %) |
|---|---|---|---|---|---|---|---|---|
| B | 99.9 | 78.6 | — | HMDI | 84.6 | 18.5 | — | 38 |
| C | 119 | 105 | — | IPDI | 89.8 | 21.2 | — | 38 |
| D | 4270 | 1570 | 745 | IPDI | 5100 | 4750 | — | 47 |
| E | 82.9 | 73.4 | — | IPDI | 62.9 | 6.50 | 2.15 | 37 |
| F | 80.0 | 39.2 | 10.0 | IPDI | 83.1 | 6.16 | 2.04 | 41 |
| G | 59.9 | 47.2 | — | HMDI | 50.8 | 3.38 | 1.12 | 36 |

Preparative Example 9

An aqueous dispersion of a silyl-terminated sulfopoly (ester-urethane) was prepared by combining in a 1-liter 3-neck round bottom flask, 105.45 g (0.14 mol) of PCPSSIP, which was prepared as described in Preparative Example 1; 60.00 g (0.14 mol) of polyethylene glycol 400; 9.32 g (0.15 mol) of ethylene glycol; 107.36 g (0.48 mol) of isophorone diisocyanate) (IPDI); 0.13 g (0.002 mol) dibutyltin dilaurate; and 90 mL of methyl ethyl ketone. The mixture was stirred and heated to 80° C. for 4 hours, after which time a solution of 18.52 g (0.0 mol) 3-aminopropyltriethoxysilane in 83 mL methyl ethyl ketone was added to the flask and the mixture was stirred at 55° C. for an additional 15 minutes. As the mixture was vigorously stirred, 260 mL of water was added to the flask over a 15-minute period. The flask was then fitted with a distillation head and a condenser and the methyl ethyl ketone was distilled out of the flask under reduced pressure to afford a dispersion of a silyl-terminated sulfopoly(ester-urethane) in water, 35 percent solids by weight. This polymer dispersion was designated Dispersion H.

Preparative Example 10

An aqueous dispersion of a silyl-terminated sulfopoly (ester-urethane) in which was further dispersed a fluorescent dye was prepared by the general procedure of Preparative Example 2, except the reagents were charged as follows: The sulfopolyester diol of Preparation A with a hydroxyl equivalent weight of 370 (59.94 g, 0.08 mol); 47.16 g (0.09 mol) TONE 0201; HMDI (50.77 g, 0.19 mol); and 3-aminopropyltriethoxysilane (18.52 g, 0.08 mol) were allowed to react as described in Preparative Example 2. HOSTASOL YELLOW 3G (1.65 g) was added to the polymer solution before the water was added. Upon removal of the solvent by distillation, both the polymer and the fluorescent dye became dispersed in the water, 25 percent solids by weight. This dispersion of fluorescent dye and polymer was designated Dispersion I.

Preparative Example 11

An aqueous dispersion of a silyl-terminated sulfopoly (ester-urethane) was prepared by combining in a 2-liter 3-neck round bottom flask, 77.70 g (0.105 mol) of PCPSSIP, prepared as described in Preparative Example 1, 13.10 g (0.025 mol) of TONE 0201, 17.08 g (0.275 mol) ethylene glycol, 96.42 g (0.434 mol) of IPDI, 0.19 g (0.30 mmol) dibutyltin dilaurate, and 137 mL methyl ethyl ketone. The mixture was stirred and heated to 80° C. for 4 hours, after which time a solution of 11.48 g (0.052 mol) 3-aminopropyltriethoxysilane in 129 mL methyl ethyl ketone was added to the flask and the mixture was stirred at 55° C. for an additional 15 minutes. As the mixture was vigorously stirred, 321 mL of water was added to the flask over a 15-minute period. The flask was then fitted with a distillation head and a condenser, and the methyl ethyl ketone was distilled out of the flask under reduced pressure to afford a dispersion of a silyl-terminated sulfopoly(ester-urethane) in water, 36 percent solids by weight. This polymer dispersion was designated Dispersion J.

Examples 1-20

A variety of ink jet inks were prepared according to the general procedure for making inks, using the amounts of ingredients shown in Tables 2 and 3.

The inks of Examples 1 and 5, with a total solids content of 32 and 40 weight percent, respectively, were ink jet printed using an XJ128-200 piezo print head operated at room temperature. The print head operating parameters were 35 volts and 1250 Hz. Solid patterns along with lines and dots were printed onto CONTROLTAC 180-10 VINYL FILM using an x-y translational stage. The print head manufacturer's recommendation for viscosity range of fluids to be used with the XJ128-200 print head is 10-12 mPas·sec. The viscosities of inks of Examples 1 and 5 exceeded the recommended range, yet the compositions printed well without blocking any of the print head nozzles and produced acceptable printed images.

A plot of viscosity versus shear rate at 25° C. for the magenta ink of Example 1 is shown in FIG. 1. A plot of viscosity versus shear rate at 25° C. for the cyan ink of Example 5 is shown in FIG. 2. A plot of viscosity versus shear rate at 25° C. for the inks of Examples 6, 7, and 8 which comprise an ink set is shown in FIG. 3.

TABLE 2

| | EXAMPLE NO. | | | | | | | |
|---|---|---|---|---|---|---|---|---|
| | 1 | 2 | 3 | 4 | 5 | 6 | 7 | 8 |
| AMOUNT OF LISTED INGREDIENT IN PARTS BY WEIGHT | | | | | | | | |
| Dispersion B | 9 | — | — | — | 6 | 20 | 20 | 20 |
| Dispersion D | — | 19 | — | — | — | — | — | — |
| Dispersion E | — | 19 | — | — | — | — | — | — |
| Dispersion F | 21 | — | — | — | 14 | 20 | 20 | 20 |
| Dispersion G | — | — | 19 | — | — | — | — | — |
| Dispersion H | — | — | 19 | — | — | — | — | — |
| Dispersion I | — | — | — | 32 | — | — | — | — |
| Magenta millbase | 2 | 2 | 2 | — | — | — | — | — |
| Cyan millbase | — | — | — | — | 1.5 | — | — | — |
| JETSPERSE QJD-3122 | — | — | — | — | — | 2.5 | — | — |
| JETSPERSE YJD-3174 | — | — | — | — | — | — | 2.5 | — |
| JETSPERSE BJD-3115 | — | — | — | — | — | — | — | 2.5 |
| HIGHLINK OG 1-32 | 8 | — | — | 8 | — | 10 | 10 | 10 |
| SILWET L-77 | 0.06 | 0.05 | 0.06 | 0.06 | — | — | — | — |
| TERGITOL 15-S-7 | — | — | — | — | — | 0.25 | 0.25 | 0.25 |
| PHYSICAL PROPERTIES | | | | | | | | |
| Surface Tension (mN/meter) | 33.3 | 33.1 | 32.1 | 33.4 | 44.6 | 36.6 | 40.0 | 37.2 |
| Viscosity (mPa · s) at 100 s$^{-1}$ | NM | NM | NM | NM | NM | 20.8 | 27.5 | 31.9 |
| Reflectance Color Density | NM | NM | NM | NM | NM | 0.91 | 1.136 | 1.335 |

TABLE 3

| | EXAMPLE NO. | | | | | | | | | | | |
|---|---|---|---|---|---|---|---|---|---|---|---|---|
| | 9 | 10 | 11 | 12 | 13 | 14 | 15 | 16 | 17 | 18 | 19 | 20 |
| AMOUNT OF LISTED INGREDIENT IN PARTS BY WEIGHT | | | | | | | | | | | | |
| Dispersion B | 4 | 4 | 4 | 4 | 4 | 4 | 4 | 4 | 2.2 | 2.2 | 2.2 | 2.2 |
| Dispersion F | 9 | 9 | 9 | 9 | 9 | 9 | 9 | 9 | 4 | 4 | 4 | 4 |
| Dispersion J | — | — | — | — | — | — | — | — | 6.5 | 6.5 | 6.5 | 6.5 |
| JETSPERSE YJD-3174 | — | 1.33 | — | — | — | 1.33 | — | — | 1.33 | — | — | — |
| JETSPERSE BJD-3115 | 0.667 | — | — | — | 0.667 | — | — | — | — | — | 0.667 | — |
| JETSPERSE QJD-3122 | — | — | 2.67 | — | — | — | 2.67 | — | — | 2.67 | — | — |
| JETSPERSE LJD-309 | — | — | — | 8 | — | — | — | 8 | — | — | — | 8.0 |
| TERGITOL TMN-6 | — | — | — | — | 0.175 | 0.175 | 0.175 | 0.175 | 0.175 | 0.175 | 0.175 | 0.175 |
| DEIONIZED WATER | 13 | 13 | 13 | 10 | 6.17 | 6.17 | 6.17 | 6.17 | 6.17 | 5.0 | 4.0 | — |
| DIETHYLENE GLYCOL | 6 | 6 | 6 | 6 | 6.33 | 6.33 | 6.33 | 6.33 | 6.33 | 6.33 | 6.33 | 9.0 |
| FLUORAD FC-171 | 0.15 | 0.15 | 0.15 | 0.15 | 0.175 | 0.175 | 0.175 | 0.175 | 0.15 | 0.15 | 0.15 | 0.15 |
| PHYSICAL PROPERTIES | | | | | | | | | | | | |
| Surface Tension (mN/meter) | 20.2 | 19.8 | 20.1 | 20.6 | NM | NM | NM | NM | 19.7 | 20.0 | 20.1 | 20.2 |
| Viscosity (mPa · s) at 100 s$^{-1}$ | 4.72 | 5.45 | 5.0 | 3.6 | NM | NM | NM | NM | 9.53 | 10.7 | 10.4 | 7.38 |

Example 21

The cyan, yellow, magenta, and black inks prepared as described in Examples 9-12 were loaded into replacement ink jet ink cartridges (color cartridge ARC—SO$_{20089}$-E and black cartridge ARC—SO20108-E), available from MIS Associates, Inc. (Lake Orion, Mich.) and were jetted onto COPYPLUS letter size standard white paper (standard weight 20/50 LB), available from International Paper; IBM DIGITAL PHOTO INK JET PAPER, and HEWLETT-PACKARD PREMIUM GRADE GLOSSY INK JET PAPER using an EPSON MODEL 850 COLOR STYLUS piezo ink jet printer, available from Epson America Corp. (Long Beach, Calif.). Printing was done at 1440 dpi using the PhotoEnhanced mode of the Epson 850 Color Stylus. Resulting image quality was high. The printed substrates were positioned at a 45 degree angle, and 5 drops of deionized water from a disposable pipette were dropped onto the printed image. No ink displacement by water was observed for the respective printed images. The printed substrates were positioned horizontally. Two drops of deionized water were placed on the printed image, and then after 5 seconds, double rubbed 2-3 times with an index finger. No marring or distortion of the respective images was observed.

Example 22

The cyan, yellow, magenta, and black inks prepared as described in Examples 13-16 were loaded into an XJ 128-200 piezoelectric ink jet print head, available from XAAR Americas (Schaumburg, Ill.) and were jetted onto CONTROLTAC 180-10 vinyl film, available from Minnesota Mining and Manufacturing Company (St. Paul, Minn.), using an X-Y positionable printer platform, to provide a first image. The image was analyzed visually and no missing or stray nozzle spray patterns were observed. After the first image was printed, the print head containing the inks was allowed to stand for 20 minutes and then the image was printed again onto an identical substrate to provide a second image. The second image was analyzed visually to detect missing or stray nozzle spray patterns. The second image was identical to the first image. This example illustrates the excellent open time of these ink jet inks.

Example 23

The yellow ink jet ink prepared as described in Example 14 was printed onto a TEXWIPE TX 309 high-density cotton wipe, available from Texwipe Co. (Upper Saddle River, N.J.) using an XJ 128-200 piezoelectric ink jet print head. The wipe was allowed to dry at room temperature and was then subjected to five wash and rinse cycles in a aytag Stacked Laundry Pair Model LS7804 commercial washing machine at 43° C. (settings: hot, small load, 30 g of 1993 Standard AATCC (American Association of Textile Chemists and Colorists (Research Triangle Park, N.C.) reference detergent without brightener). The wipe was allowed to dry at room temperature between wash cycles. The reflectance color density was measured with a Gretag SPM55 spectrophotometer, available from Gretag Imaging, Inc. (Rochester, N.Y.).

The color density results are shown in Table 4, and demonstrate the excellent washfastness of the ink jet ink.

TABLE 4

| No. of Wash Cycles | Reflectance Color Density (Dy) | % of Original Color Density Retained |
|---|---|---|
| 0 | 0.74 | 100 |
| 1 | 0.69 | 92.7 |
| 2 | 0.68 | 91.2 |
| 3 | 0.68 | 91.6 |
| 4 | 0.67 | 90.1 |
| 5 | 0.67 | 90.5 |

Adhesion of Inks to Various Substrates

The adhesion of the ink prepared in Example 3 to various substrates was measured according to the method of ASTM D3359-A Tape Test Method B. Prior to testing, the ink was coated onto the substrates using a #8 wire wound rod and was allowed to dry. The results of the test, showing the percentage of ink remaining on the substrate, are shown in Table 5.

TABLE 5

| SUBSTRATE | % ADHESION |
|---|---|
| SCOTCHLITE DG-LPD SERIES 3970 REFLECTIVE SHEETING | 0 |
| SCOTCHLITE HI SERIES 3870 REFLECTIVE SHEETING | 20 |
| SCOTCHLITE REFLECTIVE SHEETING #510 | 90 |
| SCOTCHLITE REFLECTIVE SHEETING #780 | 100 |
| CONTROLTAC 680-10 VINYL FILM | 50 |
| CONTROLTAC 180-10 VINYL FILM | 98 |
| CONTROLTAC PLUS GRAPHIC MARKING FILM WITH COMPLY PERFORMANCE #3540C | 99 |
| CONTROLTAC PLUS VINYL FILM #3650-114 | 90 |
| PANAFLEX 931 FLEXIBLE SUBSTRATE | 0 |
| PANAFLEX 945 FLEXIBLE SUBSTRATE | 0 |

The adhesion of the ink prepared in Example 3 to various substrates was measured according to the method of ASTM D3359-A Tape Test Method B. Prior to testing, the ink was coated onto the substrates using a #8 wire wound rod and was allowed to dry. The results of the test, showing the percentage of ink remaining on the substrate, are shown in Table 6.

TABLE 6

| SUBSTRATE | % ADHESION |
|---|---|
| SCOTCHLITE DG-LPD SERIES 3970 REFLECTIVE SHEETING | 0 |
| SCOTCHLITE HI SERIES 3870 REFLECTIVE SHEETING | 40 |
| SCOTCHLITE REFLECTIVE SHEETING #510 | 100 |
| SCOTCHLITE REFLECTIVE SHEETING #780 | 100 |
| CONTROLTAC 680-10 VINYL FILM | 100 |
| CONTROLTAC 180-10 VINYL FILM | 100 |
| CONTROLTAC PLUS GRAPHIC MARKING FILM WITH COMPLY PERFORMANCE #3540C | 100 |
| CONTROLTAC PLUS VINYL FILM #3650-114 | 100 |
| PANAFLEX 931 FLEXIBLE SUBSTRATE | 0 |
| PANAFLEX 945 FLEXIBLE SUBSTRATE | 90 |

Dichroic Behavior of a Silyl-Terminated Poly(Ester-Urethane) Dispersion In Water Dispersion D was placed in a Rheometrics Optical Analyzer, available from Rheometric Scientific (Piscataway, N.J.). Instrument parameters were: sensitivity for lockin 1=0.25; sensitivity for lockin 2=0.25; number of readings =500; wavelength (nm)=632.8; reference IDC (V)=1.156616; IDC(0) (V)=0; temperature =25° C.; data sampling rate (sec)=0.008; strain rate (1/sec)=20; motor motion (sec)=0.5000216. Couette geometry was: inner bob radius (cm)=1.5; gap (cm)=0.1; light path length (cm)=0.1; number of zones=1.

A step strain of 20 was applied and linear dichroism was determined as a function of time as shown in FIG. 4. The appearance of linear dichroism upon application of a step strain, and subsequent disappearance of linear dichroism over time indicates that the dispersion is shear deformable, that is, the polymeric particles are isotropic (i.e., spherical) without applied shear, and deform with applied shear into an anisotropic form.

Examples 24-27

A blendable ink jet ink set was prepared according to the general procedure for making inks, using the amounts of ingredients shown in Table 7.

TABLE 7

| | EXAMPLE NO. | | | |
|---|---|---|---|---|
| | 24 | 25 | 26 | 27 |
| | AMOUNT OF LISTED INGREDIENT IN PARTS BY WEIGHT | | | |
| Dispersion B | 4 | 4 | 4 | 4 |
| Dispersion F | 9.9 | 9.9 | 9.9 | 9.9 |
| DEIONIZED WATER | 6.17 | 6.17 | 6.17 | 6.17 |
| DIETHYLENE GLYCOL | 3.17 | 3.17 | 3.17 | 3.17 |
| JETSPERSE YJD-3174 | 1.33 | — | — | — |
| JETSPERSE BJD-3115 | — | 0.8 | — | — |
| JETSPERSE QJD-3122 | — | — | 2.67 | — |
| CAB-O-JET 300 | — | — | — | 5.75 |
| DOWANOL PnP | 3.17 | 3.17 | 3.17 | 3.17 |

TABLE 7-continued

| | EXAMPLE NO. | | | |
|---|---|---|---|---|
| | 24 | 25 | 26 | 27 |
| SILWET L-77 | 0.2 | 0.2 | 0.2 | 0.2 |
| TERGITOL TMN-6 | 0.15 | 0.15 | 0.15 | 0.15 |
| PHYSICAL PROPERTIES | | | | |
| Surface Tension (mN/meter) | 28.7 | 26.8 | 26.9 | 27.6 |
| Viscosity (mPa · s) at 100 s$^{-1}$ | NM | NM | NM | NM |

The inks of Examples 24-27 were combined in a vial and shaken by hand in amounts as shown in Table 8.

TABLE 8

| Parts by Weight of Inks Combined | | | |
|---|---|---|---|
| Ink of Example 24 | Ink of Example 25 | Ink of Example 26 | Ink of Example 27 |
| 1 | 1 | — | — |
| 1 | — | 1 | — |
| 1 | — | — | 1 |
| — | 1 | 1 | — |
| — | 1 | — | 1 |
| 1 | 1 | 1 | — |
| 1 | 1 | 1 | 1 |

The inks were examined visually for any instability and/or settling, none was evident after a 24 hour period. This illustrates the blendability of ink sets according to the invention.

Examples 28-33

A variety of ink jet inks were prepared according to the general procedure for making inks, using the amounts of ingredients shown in Table 9.

TABLE 9

| | EXAMPLE NO. | | | | | |
|---|---|---|---|---|---|---|
| | 28 | 29 | 30 | 31 | 32 | 33 |
| AMOUNT OF LISTED INGREDIENT IN PARTS BY WEIGHT | | | | | | |
| Dispersion B | 2 | 2 | 2 | 2 | 2.67 | 2 |
| Dispersion F | 4.5 | 4.5 | 4.5 | 4.5 | 6.6 | 4 |
| JONCRYL 537 | 6.5 | 6.5 | 6.5 | 6.5 | — | — |
| JONCRYL 1972 | — | — | — | — | 4.63 | — |
| RHOPLEX SG-10M | — | — | — | — | — | 6.5 |
| JETSPERSE YJD-3174 | 1.33 | — | — | — | — | — |
| JETSPERSE BJD-3115 | — | 0.667 | — | — | 0.8 | 0.667 |
| JETSPERSE QJD-3122 | — | — | 2.67 | — | — | — |
| JETSPERSE LJD-3109 | — | — | — | 5.5 | — | — |
| DEIONIZED WATER | 7 | 7 | 7 | 7 | 6.17 | 6.17 |
| HIGHLINK OG 1-32 | — | — | — | — | — | — |
| DIETHYLENE GLYCOL | 4 | 4 | 4 | 4 | 3.17 | 6.33 |
| DOWANOL PnP | — | — | — | — | 3.17 | — |
| FLUORAD FC-171 | 0.15 | 0.15 | 0.15 | 0.15 | — | 0.15 |
| TERGITOL TMN-6 | — | — | — | — | 0.15 | 0.15 |
| SILWET L-77 | — | — | — | — | 0.2 | — |
| PHYSICAL PROPERTIES | | | | | | |
| Surface Tension (mN/meter) | 19.3 | 20 | 19.9 | 20.5 | NM | 21.1 |
| Viscosity (mPa · s) at 100 s$^{-1}$ | 7.1 | 7.2 | 9.6 | 6.2 | NM | 7 |

Adhesion of the ink prepared in Example 29 to various substrates was measured according to the method of ASTM D3359-A Tape Test Method B. Prior to testing, the ink was coated onto the substrate using a #8 wire wound rod and was dried at 80° C. for 5 minutes. The results of the test, showing the percentage of ink remaining on the substrate, are shown in Table 10.

TABLE 10

| SUBSTRATE | % ADHESION |
|---|---|
| SCOTCHLITE DG-LPD SERIES 3970REFLECTIVE SHEETING | 100 |
| SCOTCHLITE HI SERIES 3870 REFLECTIVE SHEETING | 100 |
| CONTROLTAC 180-10 VINYL FILM | 95 |
| CONTROLTAC PLUS GRAPHIC MARKING FILM WITH COMPLY PERFORMANCE #3540C | 98 |

Various modifications and alterations of this invention will become apparent to those skilled in the art without departing from the scope and spirit of this invention. It therefore should be understood that this invention is not to be unduly limited to the illustrative embodiments set forth above, but is to be controlled by the limitations set forth in the claims and equivalents thereof.

What is claimed is:

1. An ink comprising an aqueous vehicle and dispersed particles of a silyl-terminated sulfopoly(ester-urethane), wherein the ink has a viscosity of less than about 20 mPa·s at 20° C. and at a shear rate of 1000 s$^{-1}$ and said ink is an ink jet ink.

2. The ink of claim 1, wherein the silyl-terminated sulfopoly(ester-urethane) is described by the formula:

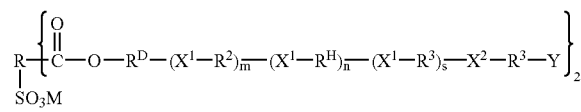

wherein

R represents a trivalent $C_6$-$C_{12}$ aryl group or a trivalent $C_1$-$C_{20}$ aliphatic group wherein M is H$^+$, an alkali metal cation, an alkaline earth metal cation, or a primary, secondary, tertiary, or quaternary ammonium cation;

each m independently represents 0 or 1, each n independently represents 0 or 1, each s independently represents 0 or 1, with the proviso that, at least one of m or n must be equal to 1;

each R$^D$ independently represents;

1) at least one of a divalent linear or branched organic group of 20 to 150 carbon atoms in units of 2 to 12 methylene groups and arylene groups of 6 to 10 carbon atoms separated by at least one of 1 to 50 catenary oxygen atoms and by 1 to 30 oxycarbonyl groups,

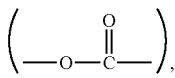

2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms, which organic group can be chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 4 to 6 carbons, or 3) the structure $\{-R^1(X^1-R^2-X^1-R^1)_p-\}$ where p is an integer from 1 to 5, produced by the reaction of a polyol with an isocyanate having the structure OCN—$R^2$—NCO to produce a segment having a molecular weight of from 500 to 4,000;

each $R^1$ independently represents a linear or branched alkylene group having 2 to 12 carbon atoms, or an arylene group having 6 to 10 carbon atoms;

each $X^1$ independently represents

each $R^2$ independently represents an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of at most 15 carbon atoms;

each $X^2$ independently represents

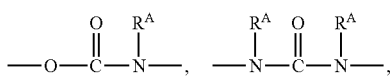

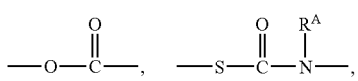

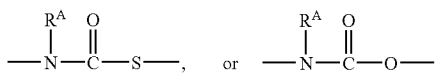

wherein each $R^A$ independently represents hydrogen, lower alkyl having 1 to 4 carbon atoms, or $R^1$—Y;

each $R^H$ independently represents a divalent hydrophobic group selected from divalent oligomeric siloxanes having the structure

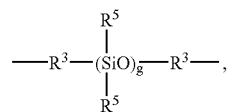

divalent organic groups having the structure

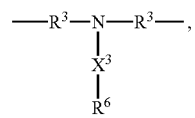

or divalent organic groups having one of the structures

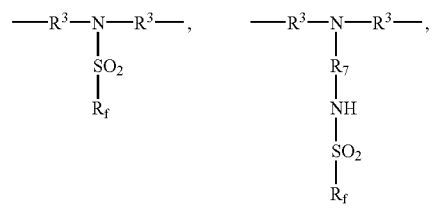

or quaternary salts thereof, wherein each $R^3$ independently represents a divalent linear or branched alkylene group having 2 to 12 carbon atoms, or a divalent arylene or alkarylene group having 6 to 20 carbon atoms;

each Y independently represents H, an alkyl group having from 1 to 20 carbon atoms, an aryl group having from 6 to 10 carbon atoms, or

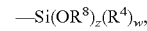

wherein each $R^4$ independently represents a monovalent lower alkyl group having from 1 to 4 carbon atoms, each $R^8$ is H or a monovalent lower alkyl group having from 1 to 4 carbon atoms, each z is independently 2 or 3, each w is independently 0 or 1, and wherein z+w=3, with the proviso that at least one Y has the formula

each $R^5$ independently represents a monovalent group selected from the group consisting of alkyl groups of 1 to 12 carbon atoms, aryl having 6 to 10 carbon atoms, or aralkyl groups having 6 to 10 carbon atoms, with at least 70 percent of $R^4$ being methyl;

each g independently represents an integer of from 10 to 300;

each $X^3$ independently represents a covalent bond, a carbonyl group,

or a divalent amido group

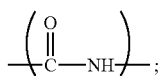

each $R^6$ independently represents a monovalent group selected from the group consisting of alkyl groups of about 4 to about 60 carbon atoms;

each $R^7$ independently represents a divalent group selected from the group consisting of alkylene groups of 2 to about 12 carbon atoms; and each $R_f$ independently represents a monovalent saturated fluoroaliphatic group having 6 to 12 carbon atoms, at least four of which are fully-fluorinated carbon atoms.

3. The ink of claim 1, wherein the ink is free of organic solvents.

4. The ink of claim 1, further comprising a colorant, wherein the colorant is a pigment.

5. The ink of claim 1, further comprising a colorant, wherein the colorant is a dye.

6. The ink of claim 1, further comprising an additional dispersed polymer.

7. The ink of claim 6, wherein the additional dispersed polymer is present in an amount of from about 0.1 to about 3 times the weight of the silyl-terminated sulfopoly(ester-urethane) polymer.

8. The ink of claim 7, wherein the additional dispersed polymer is an acrylic polymer.

9. The ink of claim 1, further comprising a humectant.

10. The ink of claim 1, wherein the ink has a solids content of at least 20 weight percent of the total ink composition.

11. The ink of claim 1, wherein the ink has a solids content of at least 30 weight percent of the total ink composition.

12. The ink of claim 1, wherein the ink has a solids content of at least 50 weight percent of the total ink composition.

13. The ink of claim 1, wherein the ink has a viscosity of less than about 5 mPa·s at 20° C. and at a shear rate of 1000 $s^{-1}$.

14. The ink of claim 2, wherein

is:

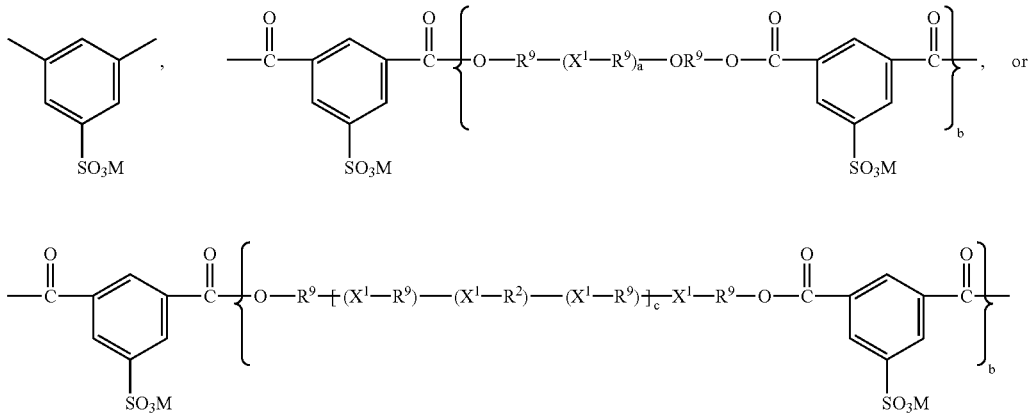

and wherein each $R^9$ independently represents a linear or branched alkylene group having 2 to 12 carbon atoms, an arylene group having 6 to 10 carbon atoms, or may also comprise an oligomeric segment.

15. The ink of claim 14, wherein the ink is contained within an ink jet printer cartridge.

16. A blendable ink set comprising at least three blendable inks, wherein each ink in the ink set comprises the ink of claim 1.

17. The ink set of claim 16, wherein the blendable inks comprise yellow; magenta, and cyan inks.

18. The ink set of claim 16, further comprising a fourth blendable ink.

19. The ink set of claim 18, wherein the fourth blendable ink is a black ink.

20. The ink set of claim 18, further comprising a fifth blendable ink.

21. The ink set of claim 20, wherein the fifth blendable ink is a white ink.

22. The ink of claim 1, wherein the ink is contained within an ink jet printer cartridge.

* * * * *

UNITED STATES PATENT AND TRADEMARK OFFICE
CERTIFICATE OF CORRECTION

PATENT NO.       : 7,368,487 B2
APPLICATION NO.  : 10/000284
DATED            : May 6, 2008
INVENTOR(S)      : Dong Wu It is certified that error appears in the above-identified patent and that said Letters Patent is hereby corrected as shown below:

Column 8,
Line 2, Delete "aminor" and insert -- a minor --, therefor.

Column 14,
Line 42, Delete "a-methylstyrene" and insert -- α-methylstyrene --, therefor.

Column 15,
Line 41, Delete "1." and insert -- I. --, therefor.

Column 16,
Line 19, Delete "B-Naphthol" and insert -- β-Naphthol --, therefor.

Column 18,
Line 12 (approx.), Delete "can.be" and insert -- can be --, therefor.

Column 20,
Line 53 (approx.), Delete "mpa·s," and insert -- mPa·s, --, therefor.
Line 54 (approx.), Delete "mpa·s," and insert -- mPa·s, --, therefor.

Column 21,
Line 39 (approx.), Delete "inkjet" and insert -- ink-jet --, therefor.

Column 27,
Line 55, Delete "ARC-SO$_{20089}$" and insert -- ARC-SO20089 --, therefor.

Column 32,
Line 61, In Claim 2, delete "represents;" and insert -- represents: --, therefor.

UNITED STATES PATENT AND TRADEMARK OFFICE
CERTIFICATE OF CORRECTION

PATENT NO. : 7,368,487 B2
APPLICATION NO. : 10/000284
DATED : May 6, 2008
INVENTOR(S) : Dong Wu It is certified that error appears in the above-identified patent and that said Letters Patent is hereby corrected as shown below:

Column 36,
Line 55, In Claim 17, delete "yellow;" and insert -- yellow, --, therefor.

Signed and Sealed this

Twenty-ninth Day of July, 2008

JON W. DUDAS
*Director of the United States Patent and Trademark Office*